United States Patent
Hughes et al.

(10) Patent No.: US 7,233,340 B2
(45) Date of Patent: Jun. 19, 2007

(54) LINKING OF IMAGES TO ENABLE SIMULTANEOUS VIEWING OF MULTIPLE OBJECTS

(75) Inventors: William Hughes, Withington (GB); Duncan William Borthwick, Hexham (GB)

(73) Assignee: Applied Imaging Corp., Santa Clara, CA (US)

( * ) Notice: Subject to any disclaimer, the term of this patent is extended or adjusted under 35 U.S.C. 154(b) by 953 days.

(21) Appl. No.: 10/428,324

(22) Filed: Apr. 30, 2003

(65) Prior Publication Data

US 2004/0170309 A1 Sep. 2, 2004

Related U.S. Application Data

(60) Provisional application No. 60/451,923, filed on Feb. 27, 2003.

(51) Int. Cl.
*G09G 5/00* (2006.01)
*G06K 9/00* (2006.01)

(52) U.S. Cl. ............... 345/629; 382/133; 345/646; 345/647; 345/648; 345/649; 345/660

(58) Field of Classification Search .............. None
See application file for complete search history.

(56) References Cited

U.S. PATENT DOCUMENTS

| | | | |
|---|---|---|---|
| 4,202,037 A | * | 5/1980 | Glaser et al. ............... 345/632 |
| 5,241,607 A | * | 8/1993 | Launay et al. .............. 382/128 |
| 5,390,291 A | * | 2/1995 | Ohashi ........................ 345/419 |
| 6,747,665 B1 | * | 6/2004 | Stoval et al. ................ 345/629 |
| 6,867,787 B1 | * | 3/2005 | Shimizu et al. ............. 345/629 |
| 2003/0012420 A1 | * | 1/2003 | Verwoerd et al. ........... 382/133 |
| 2005/0090017 A1 | * | 4/2005 | Morales ....................... 436/174 |
| 2005/0134607 A1 | * | 6/2005 | Purdy .......................... 345/629 |
| 2005/0142114 A1 | * | 6/2005 | Gieseler et al. ............. 424/93.2 |
| 2006/0257009 A1 | * | 11/2006 | Wang et al. ................. 382/128 |

OTHER PUBLICATIONS

Adobe Photoshop 5.0 User Guide for Macintosh and Windows Adobe Photoshop 5.0 User Guide, pp. 13-22; 301-358, 1998.
Adobe Photoshop 5.0 User Guide for Macintosh and Windows Adobe Photoshop 5.0 User Guide, pp. 167-193, 1998.
Adobe Photoshop 5.0 User Guide for Macintosh and Windows Adobe Photoshop 5.0 User Guide, pp. 259-288, 1998.
Carlbom et al. "Computer-assisted registration, segmentation, and 3D reconstruction from images of neuronal tissue sections" IEEE Transactions on Medical Imaging, vol. 13, Issue: 2; pp. 351-362, Jun. 1994.

(Continued)

*Primary Examiner*—Mark Zimmerman
*Assistant Examiner*—David Chu
(74) *Attorney, Agent, or Firm*—Townsend and Townsend and Crew LLP

(57) ABSTRACT

Computerized techniques are provided for linking digitized images of serial sections of a biological tissue sample. Linked, digitized images of the serial section are displayed on a display and manipulation of one digitized image causes other digitized images to be similarly manipulated. To link digitized images, a copy of a digitized image of one serial section is positioned over a digitized image of another serial section. The digitized image of the other serial section is visible through the copy. The copy is registered to the digitized image of the other serial section.

39 Claims, 16 Drawing Sheets

OTHER PUBLICATIONS

Randall et al. "Neuro3D: an interactive 3D reconstruction system of serial sections using automatic registration" Proceedings of SPIE, vol. 3261, pp. 117-126, Jun. 1998.

Rydmark et al. "Computer-assisted realignment of light micrograph images from consecutive section series of cat cerebral cortex" Journal of Microscopy, vol. 165, No. 1, pp. 29-47, Jan. 1992.

* cited by examiner

LINKING OF IMAGES TO ENABLE SIMULTANEOUS VIEWING OF MULTIPLE OBJECTS

CROSS-REFERENCES TO RELATED APPLICATIONS

This application claims priority to U.S. Provisional Application 60/451,923, filed Feb. 27, 2003, titled "LINKING OF IMAGES TO ENABLE SIMULTANEOUS VIEWING OF MULTIPLE OBJECTS," which is incorporated by reference, including Appendix A filed therewith, herein for all purposes.

BACKGROUND OF THE INVENTION

This invention relates generally to the analysis of samples such as biological tissue samples that are chemically stained for protein based markers, and more specifically to the use of a linking system and method for linking sets of images of the samples in such analysis.

Visual analysis of biological tissue samples often involves slicing the biological tissue samples into thin cross sections, often referred to as serial sections, to visualize structures of interest within the biological tissue sample. Serial sections are typically mounted on glass or plastic microscope slides. Visual analysis of mounted serial sections is often carried out by the naked eye (grossly) or by microscopy. In a typical slicing process, a tissue sample is dehydrated and embedded in paraffin to lend rigidity to the sample during slicing and mounting on a slide. Tissue samples are typically sliced into serial sections that are about 4–9 micrometers ($\mu$m) thick, however, other useful thicknesses are sliced. Once sliced, the serial sections are typically floated in water onto the microscope slides and moved into an appropriate location by a technician who physically manipulates the serial sections using, for example, a pair of tweezers or artist's brush. Being relatively thin, the serial sections are relatively delicate and when placed on microscope slides tend to deform by stretching, shrinking, being compressed, folding or a combination thereof. Moreover, the serial sections also tend to be placed on the microscope slides in rotated positions relative to one another. Such deformations and relative rotations often add to the difficulty in cross comparing serial sections.

Serial sections of a tissue sample are typically cross-compared by histologists and pathologists, as well as others, to identify and locate the same tissue structure through the serial sections. For example, pathologists often cross compare serial sections that have been variously stained to aid in identifying and locating tissue structures of interest, such as groups of cancer cells or pre-cancerous cells. Stains of use have different affinities for different tissue structures and tend to color more intensely structures for which the stains have relatively high affinity. For example, a first serial section of a tissue sample is often stained with haematoxylin and eosin, referred to as H&E staining. Haematoxylin has a relatively high affinity for nuclei, while eosin has a relatively high affinity for cytoplasm. H&E stained tissue gives the pathologist important morphological and positional information about tissue of interest. For example, typical H&E staining colors nuclei blue-black, cytoplasm varying shades of pink, muscle fibers deep pinky red, fibrin deep pink, and red blood cells orange/red. The pathologist uses positional (e.g., color) information derived from the H&E stained tissue to estimate the location of corresponding tissue regions on successive serial sections of the tissue that are typically immunohistochemically stained. The successive serial sections may be immunohistochemically stained, for example, with HER-2/neu protein (a membrane-specific marker), Ki67 protein (a nuclei-specific marker), or other known stains. The use of such stains is well known in the art and will not be discussed in further detail.

Positional information derived from H&E stained serial sections is often crudely used to locate corresponding tissue on immunohistochemically stained serial sections. Pathologists commonly hold two or more slides up to a light and grossly attempt to judge the relative locations of structures of interest. As corresponding tissues may be distorted compared to the H&E section, and/or in a different location or orientation, position estimates may be many millimeters off leading to poor and/or lengthy-repetitious analysis.

Poor and lengthy analysis arise not only in naked eye analysis of serial sections but also in computer-aided analysis of serial sections. Images of serial sections are often digitized and stored in a computer for computer-aided analysis. Present computer-aided analysis techniques do not correct for distortions and relative rotations of serial sections captured in digital images of these sections. As a result of the distortion and relative rotations of a set of serial images captured in digitized images, using location information derived from one serial section image to locate structures in another serial section image using computer-aided techniques is a laborious process fraught with misidentification and lengthy, repetitious analysis.

Accordingly, what is needed in the fields of pathology, histology, morphology, and others are new and useful methods and tools to simplify and automate cross comparisons of serial sections. Also needed are new and useful methods and tools that provide improved positional accuracy during cross comparison of serial section images by correcting for serial section deformations and relative rotations that often arise during serial section slicing and mounting.

SUMMARY OF THE INVENTION

The present invention provides computerized techniques for linking digitized images of serial sections for viewing of a biological tissue sample having microscopic features of interest.

In short, this is made possible by the use of a computerized system and computerized techniques for linking the digitized images of the serial sections. In a method of linking digitized images of serial sections, according to one embodiment, the digitized images are displayed on a computer display controlled by a computer, a copy of a digitized image of a first serial section is created, and the copy is referred to as the ghost image or transparent image. The ghost image is positioned over a digitized image of a second serial section. The digitized image of the second serial section is visible through the ghost image and is referred to as the underlying image. The ghost image is registered to the underlying image, and the ghost image and the underlying image are linked such that when manipulations are performed on either the ghost image or the underlying image, the other of the images is similarly manipulated.

In a method of linking digitized images of serial sections displayed on a computer display controlled by a computer, according to another embodiment, a ghost image is positioned over an underlying image, wherein the ghost image and the underlying images are digitized, images of different serial sections of a biological tissue sample. Imaged deformations of the serial samples are corrected in one of the ghost image or underlying image to approximately register the ghost image to the underlying image, and the ghost image and the underlying image are linked such that when manipulations are performed on either the ghost image or the underlying image, the other of the images is similarly manipulated.

According to another embodiment, a computer program product is provided for linking digitized images of serial sections of a biological tissue sample. The computer program product is stored on a computer and comprises code for creating a copy of a digitized image of a first serial section, the copy is referred to as the ghost image; code for positioning the ghost image over a digitized image of a second serial section, the digitized image of the second serial section is visible through the ghost image and is referred to as the underlying image; code for registering the ghost image to the underlying image; and code for linking the ghost image and the underlying image such that when manipulations are performed on either the ghost image or the underlying image, the other of the images is similarly manipulated.

According to yet another embodiment, a system is provided for digitizing magnified images of serial sections of a biological tissue sample and adjusting for deformations and relative rotations of the serial sections imaged in the digitized images; the system comprises a computer system including a display, a memory, and an input device, wherein the computer is configured to: (i) receive the digitized images from a charged coupled device (CCD) camera, store the digitized images in the memory, and display the digitized images on the display; (ii) create a copy of one of the digitized images of a first serial section, the copy is referred to as the ghost image; (iii) position the ghost image over another of the digitized images of a second serial section, the digitized image of the second serial section being visible through the ghost image and is referred to as the underlying image; (iv) register the ghost image to the underlying image; and (v) link the ghost image and the underlying image such that when manipulations are performed on either the ghost image or the underlying image, the other of the images is similarly manipulated.

A further understanding of the nature and advantages of the present invention may be realized by reference to the remaining portions of the specification and the drawings.

DETAILED DESCRIPTION OF THE INVENTION

Overview

The present invention provides systems and techniques for cross-comparing and analyzing cross sections (or "serial sections") of biological tissue samples, such as tumorous tissues, using a computer to correct for deformations of the serial sections captured in digitized images. Systems and techniques are also provided for correcting relative rotational displacement of the digitized images and for linking the digitized images, such that graphical manipulations performed on one serial image are similarly performed on linked serial images.

A particular application of the present invention is in the field of pathology, and other medical or bioscience fields, to correct for distortion and relative rotations between digitized images of serial sections variously stained to color select structures of interest in the serial sections. A first serial section of a tissue sample, often used as a reference section, is typically stained with haematoxylin and eosin, and is commonly referred to as an H&E section. Subsequent serial sections of the tissue sample are often immunohistochemically stained with makers to color and aid in locating structures of interest, such as cancerous and pre-cancerous cells. Known immunohistochemical stains include, for example, HER-2/nue protein, Ki67 protein, ER, and PgR.

Figure 1:
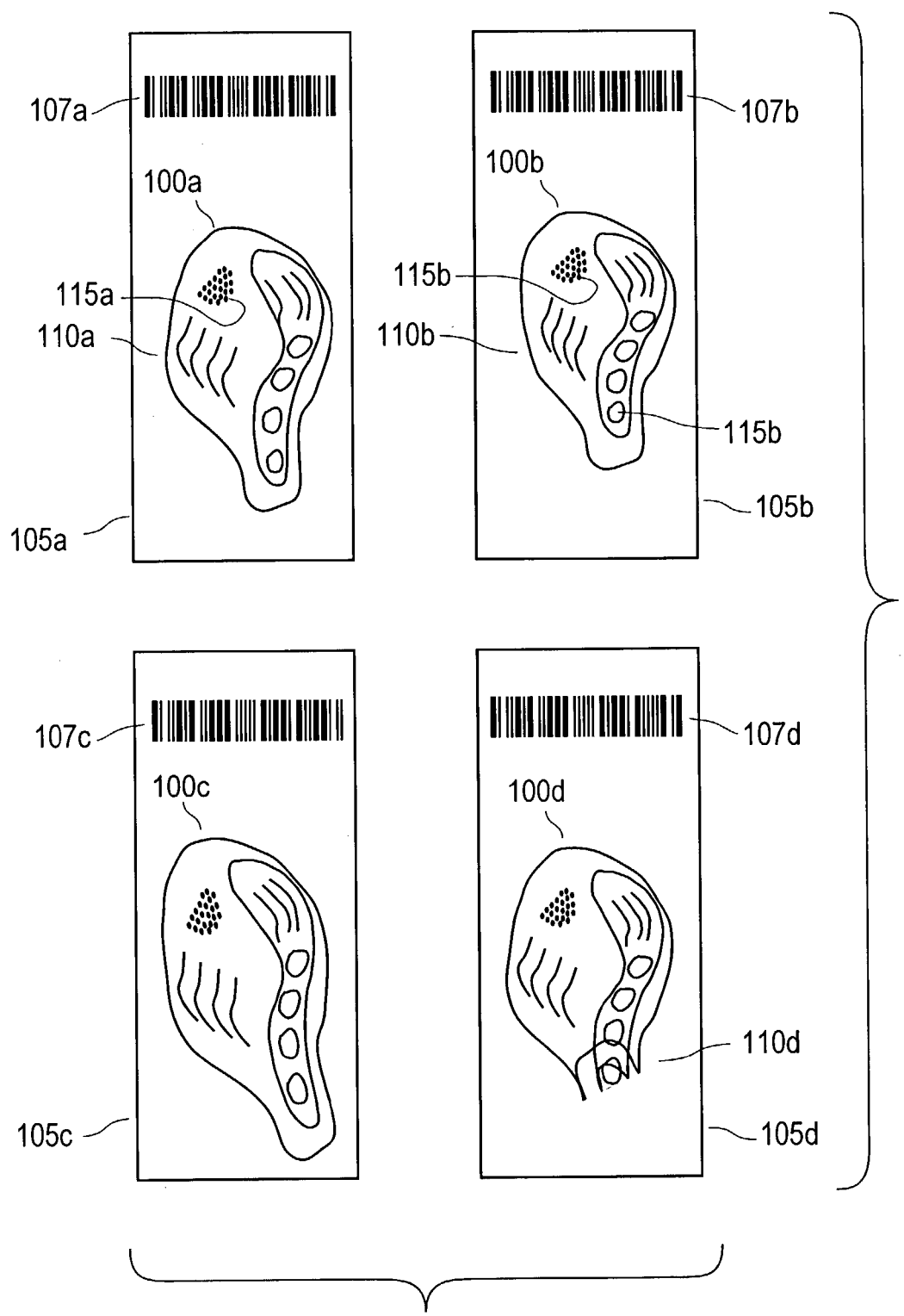
FIG. 1 is a schematic of set of serial sections of a tissue sample according to an embodiment of the present invention.

FIG. 1 is a schematic of set of serial sections of a tissue sample according to an embodiment of the present invention. The serial sections are labeled 100a–100d and are mounted respectively on microscope slides 105a–105d. The microscope slides may optionally include respective bar codes 107a–107d for identifying and cataloging the serial sections. The serial sections may be any tissue sample of interest, such as a lymph node having cancerous or pre-cancerous cells. As with most serial sections of a tissue sample, serial sections 100a–100d are distorted or deformed with respect to one another. For example, serial section 100b is shown to be compressed in region 110b as compared with the corresponding region 110a of serial section 100a. Serial section 100b is also shown to be vertically compressed relative to serial section 100a. In addition to being compressed, serial sections are also stretched. For example, serial section 100c is shown to be vertically stretched. Serial section 100c is also shown to be rotated relative to the other serial sections. Another common deformation is the folding of a portion of a serial section, such as that shown in region 110d of serial section 100d.

The deformations and relative rotations shown in serial sections 100a–100d typically occur during slicing and during mounting of the serial sections onto respective microscope slides 105a–105d. For example, serial section compressions, such as the compression in region 110b of serial section 110b, may occur as the serial section is mounted onto microscope slide 105b by a laboratory technician coaxing the serial section into place on the microscope slide with, for example, a pair of tweezers or an artist's brush.

Deformations and relative rotations of serial sections often make cross comparisons between serial sections relatively difficult. For example, location information of a structure 115a derived from serial section 100a may provide limited help in locating the corresponding structure 115b in serial section 100b as structures 115a and 115b are in different relative locations within their respective serial sections as a result of compression in region 110b of serial section 100b. This and other cross comparison difficulties are addressed by embodiments of the present invention.

Microscope and Computer System

Figure 2:
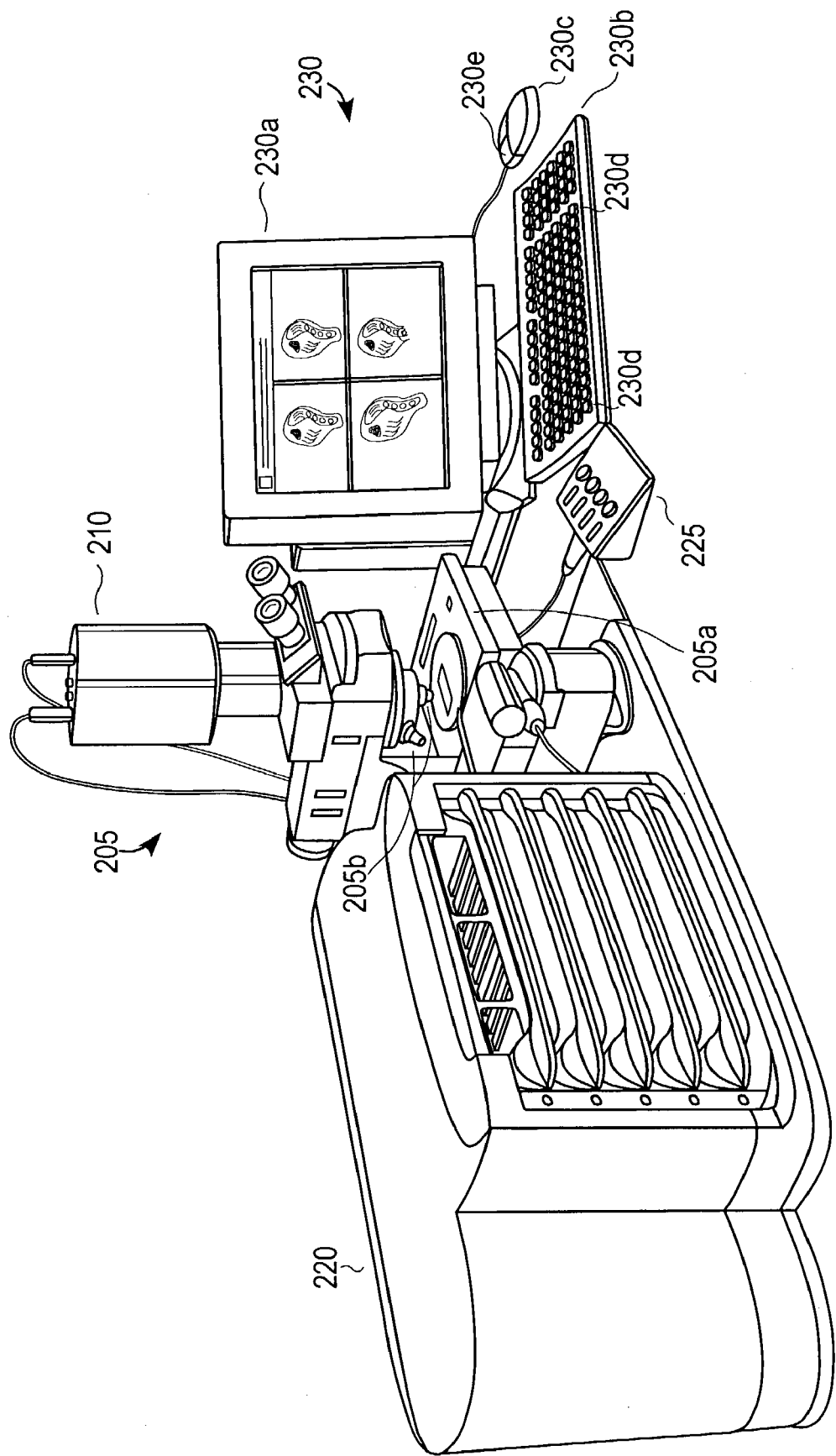
FIG. 2 is a simplified schematic of a system for generating, storing, and processing digitized images of serial sections according to an embodiment of the present invention.

FIG. 2 is a simplified schematic of a system 200 for generating, storing, and processing digitized images of serial sections, such as images of serial sections 100a–100d, according to an embodiment of the present invention. According to one embodiment, system 200 is the ARIOL SL-50™ system manufactured by Applied Imaging Corporation, owner of the present invention. System 200 includes a microscope 205 with an attached camera 210, a slide loader 220, a stage manipulator 225, and a computer 230. System 200 is presently described in greater detail.

Microscope 205 magnifies images of the serial sections, usually, but not necessarily, one at a time, for ocular display and for image capture by camera 210. Microscope 205 is configured to magnify images of the serial sections at variety of magnifications, such as, but not limited to, 1.25×, 5×, 10×, 20×, and 40×. According to one embodiment, microscope 205 is a BX-61™ microscope manufactured by Olympus America, Inc. According to one embodiment, camera 210 is a 4912 CCIR™ camera manufactured by COHU, Inc. and has a 752×582 active-CCD-pixel matrix. The active-CCD-pixel matrix digitizes images of serial sections for delivery to computer 230.

Slide loader 220 is an automated device for delivery and removal of microscope slides to and from the microscope's stage 205a, which positions the slides under the microscope's objectives 205b for magnification. According to one embodiment, slide loader 220 holds up to 50 microscope slides, which can be randomly accessed for delivery to stage 205a. According to one embodiment, slide loader 220 is an SL-50™ Random Access Slide Loader manufactured by Applied Imaging Corporation.

According to one embodiment, computer 230 is a dual processor personal computer having two Intel XEON™ 1.8 gigahertz microprocessors and runs WINDOWS™ XP PROFESSIONAL™ operating system. The computer includes a display 230a, input devices 230b and 230c, and a memory device (not shown). Display, as referred to herein, includes any device capable of displaying digitized images including, but not limited to, a CRT or liquid crystal display. Input device, as referred to herein, includes any device capable of generating computer input including, but not limited to, a mouse, trackball, touchpad, touchscreen, joystick, keyboard, keypad, voice activation and control system, or the like. The memory device includes any memory that is capable of storing and retrieving digital images and includes, but is not limited to, one or a combination of, a hard drive, floppy disk, compact disk (CD), digital videodisk (DVD), ROM, EPROM, EEPROM, DRAM, SRAM, or cache memory. While the forgoing describes equipment and software used in embodiments of the present invention, those of skill in the art will recognize that various substitutes and alternatives may be used in system 200 without deviating from the spirit of the present invention.

The functionality of the specific embodiment is to provide digitized images for display so that a user can examine and manipulate the images. Computing and display technologies are ever evolving, and the invention does not require any specific type or configuration of computer. In addition, while the specific embodiment uses a CCD (charged coupled device) camera to digitize the magnified images of the microscope slides, the invention does not require any specific type of digitizing mechanism. Cameras using other imaging array technology, such as CMOS, could be used, or the magnified slide image could be captured on photographic film, and the photographic film could be scanned in order to digitize the images. Further, as described in U.S. patent application Ser. No. 10/165,770, filed Jun. 6, 2002, and published Jan. 16, 2003 as Published Patent Application No. 2003/0012420 A1 to Nico Peter Verwoerd et al., microscope slides can be digitized using a high-resolution flatbed scanner.

Image Correction and Linking

Figure 3A:
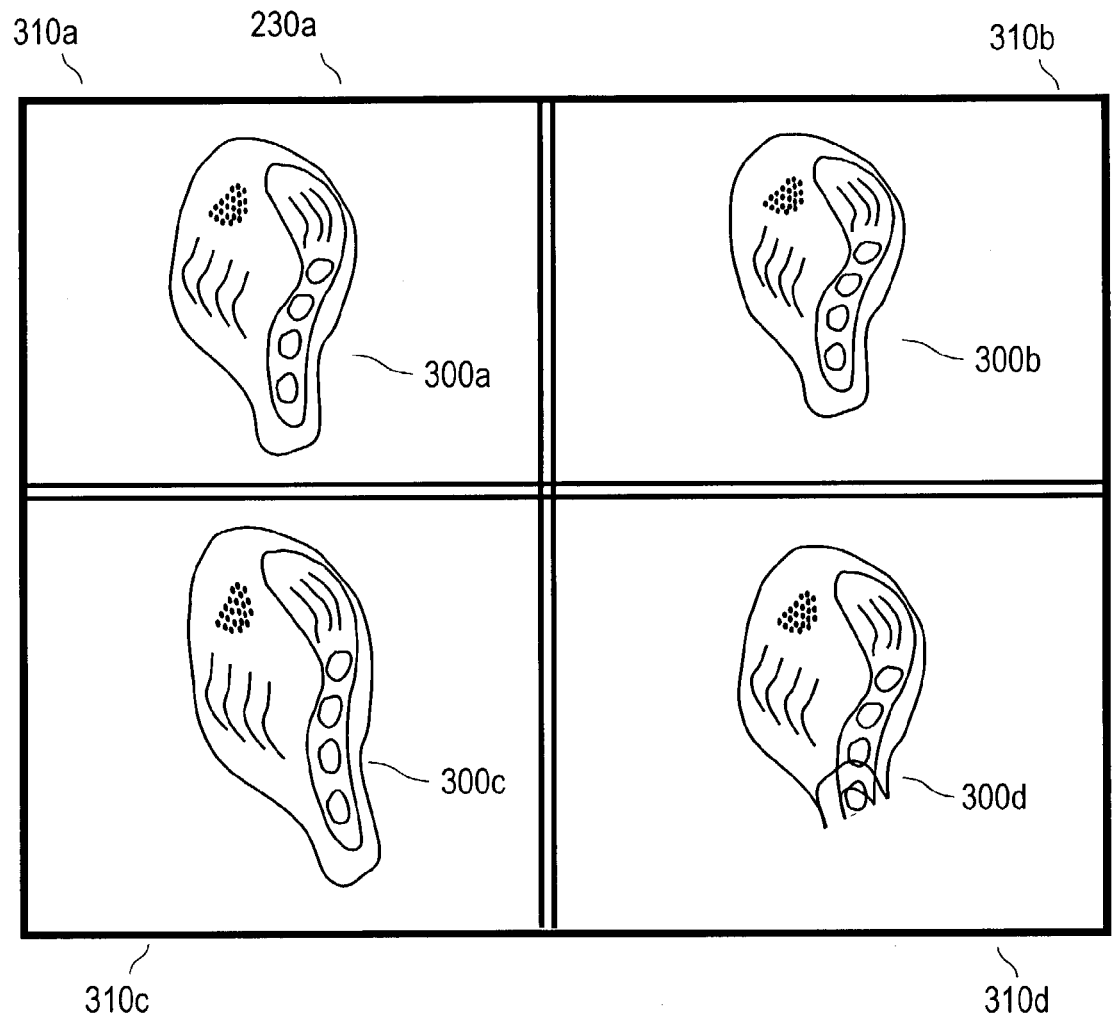
FIG. 3A is a simplified schematic of digitized images displayed on a display and corresponding, respectively, to a set of serial sections.

FIG. 3A is a simplified schematic of digitized images 300a–300d displayed on display 230a and corresponding, respectively, to serial sections 100a–110d. Serial section images 300a–300d are read from computer memory and displayed in screen windows 310a–310d, respectively. According to one embodiment, two or more of the serial section images can be linked and locked (linking and locking are explained in detail below) such that graphical manipulation of one serial section image causes each linked and locked serial section image to be similarly manipulated. For example, zooming in (i.e., magnifying) on a serial section image, panning across or rotating the serial section image, causes respective zooming, panning, or rotation of linked and locked serial section images. Zoom, pan, rotate or other graphical manipulations of serial section images 300a–300d are controlled by a user using one or both input devices 230b and 230c. Graphical manipulations may be selected from drop down menus, context menus, floating menus, graphical user interface (GUI) buttons displayed on display 230a, combinations of mouse clicks, combinations of mouse clicks and keyboard strokes, or other known computer control mechanisms.

Figure 3B:
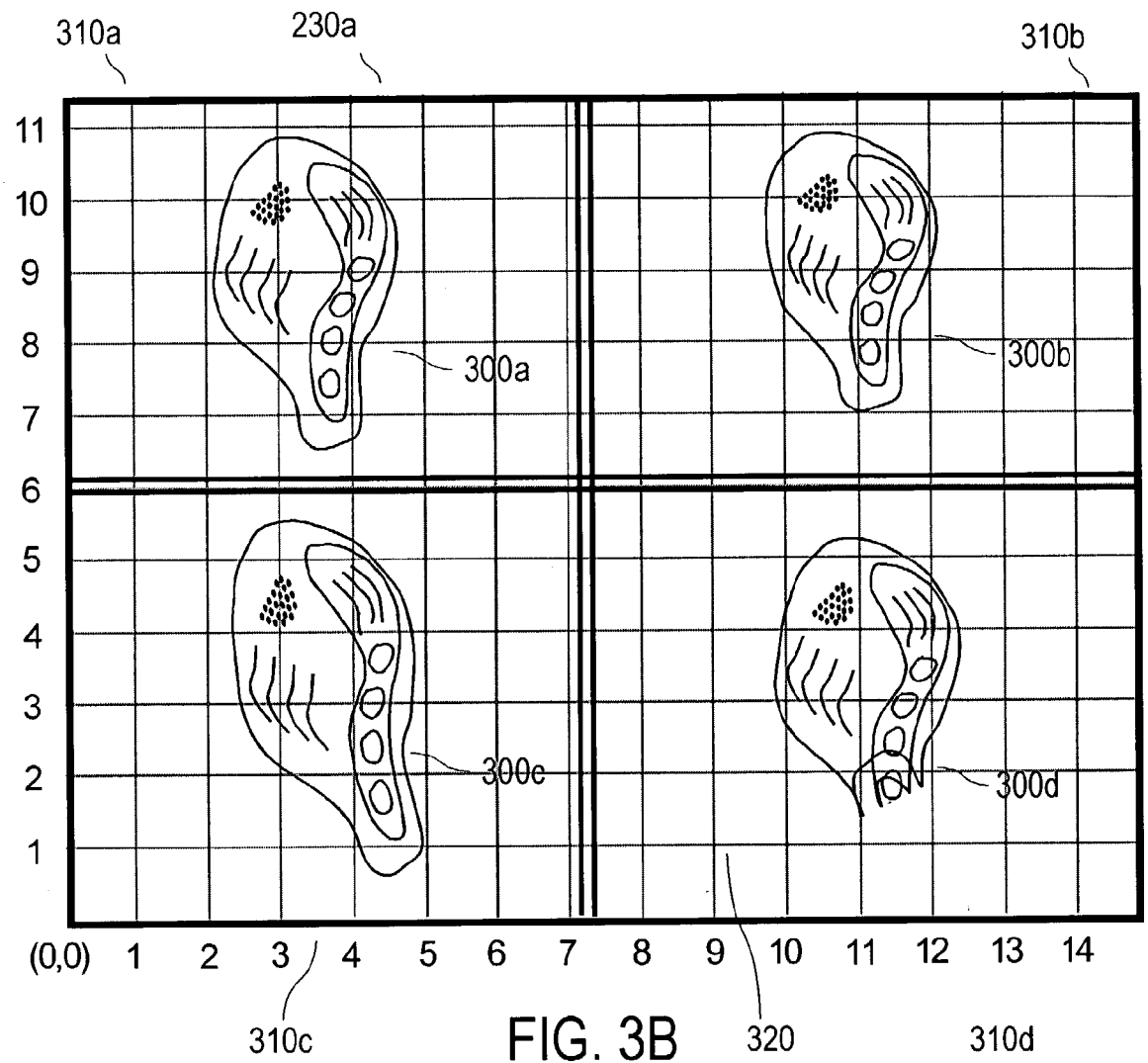
FIG. 3B is a simplified schematic of a coordinate system superimposed over digitized images displayed on a display.

According to one embodiment, serial section images 300a–300d are mapped to a coordinate system 320, which is shown superimposed over display 230c in FIG. 3B. In mapping serial section images to coordinate system 320, image data, such as pixel-image data, of the serial section images are assigned coordinates (e.g., (x,y) or (r,θ) coordinates) relative to their positions on coordinate system 320. Coordinate system 320 is used as a reference system to track the location of serial section images and their associated image data, such as pixel-image data. Coordinates assigned to the pixel-image data are updated as the serial sections are moved (or "dragged") across display 230a and as the serial sections are morphed to form transformed images (image transformation is discussed below in detail).

While coordinate system 320 is shown is FIG. 3B as an orthographic system (e.g., a Cartesian coordinate system), this is not necessary; coordinate system 320 may be a polar coordinate system or other usefull system. Although the origin of coordinate system 320 is shown to be located in the lower left corner of display 230, the origin could be alternately located.

Figure 4A:
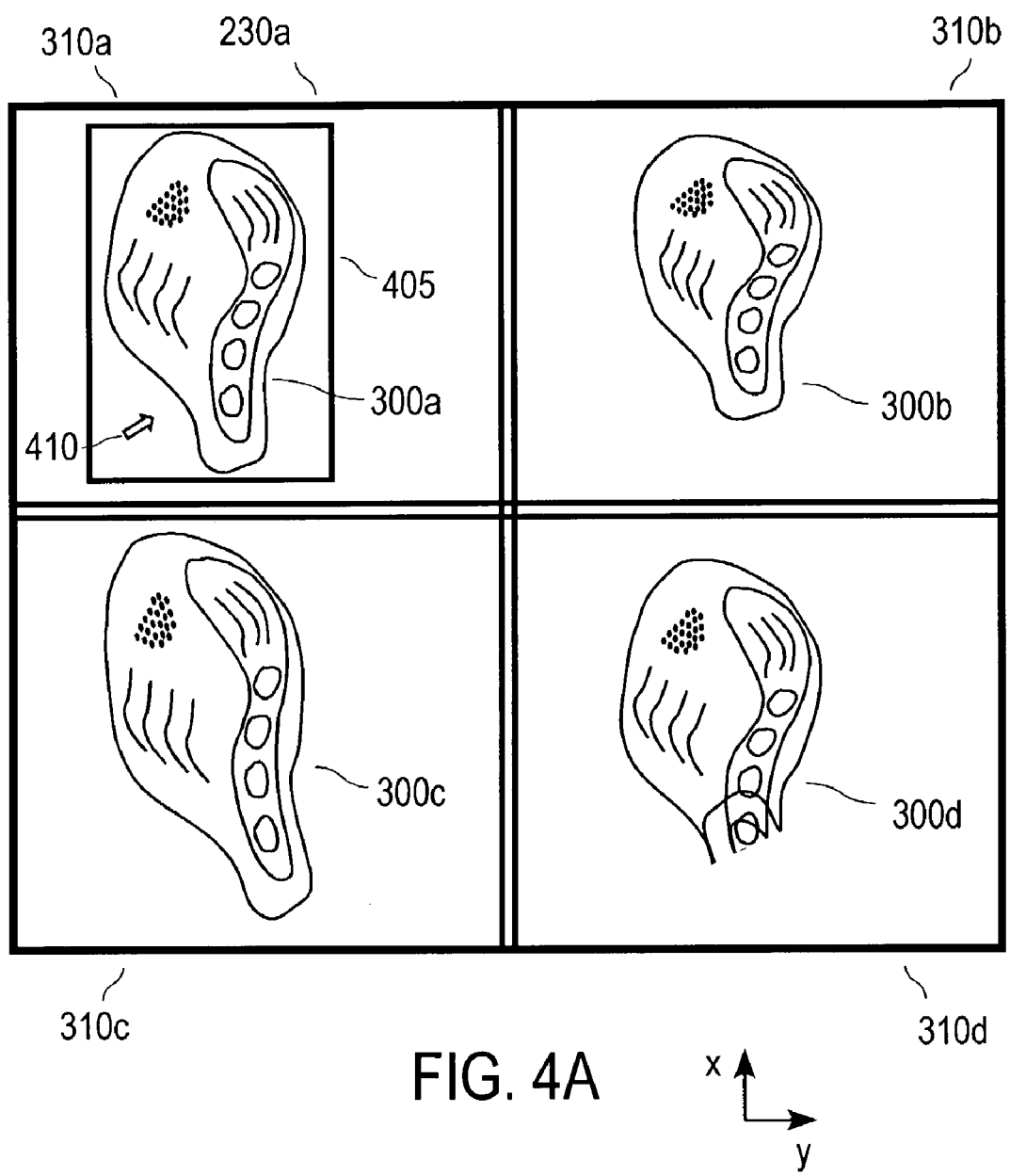
FIG. 4A is a simplified schematic of a set of digitized images of serial sections with a reference-link region overlying one of the digitized images.
Figure 4B:
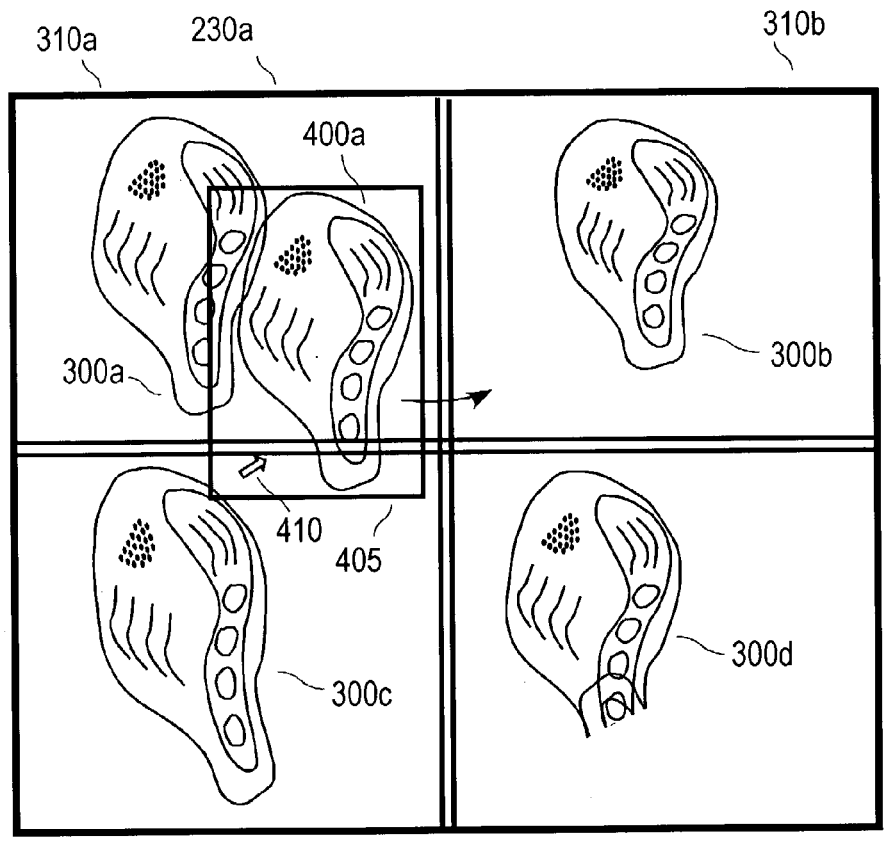
FIGS. 4B–4D show a time ordered sequence of events of dragging a ghost image over another image 300b.
Figure 4C:
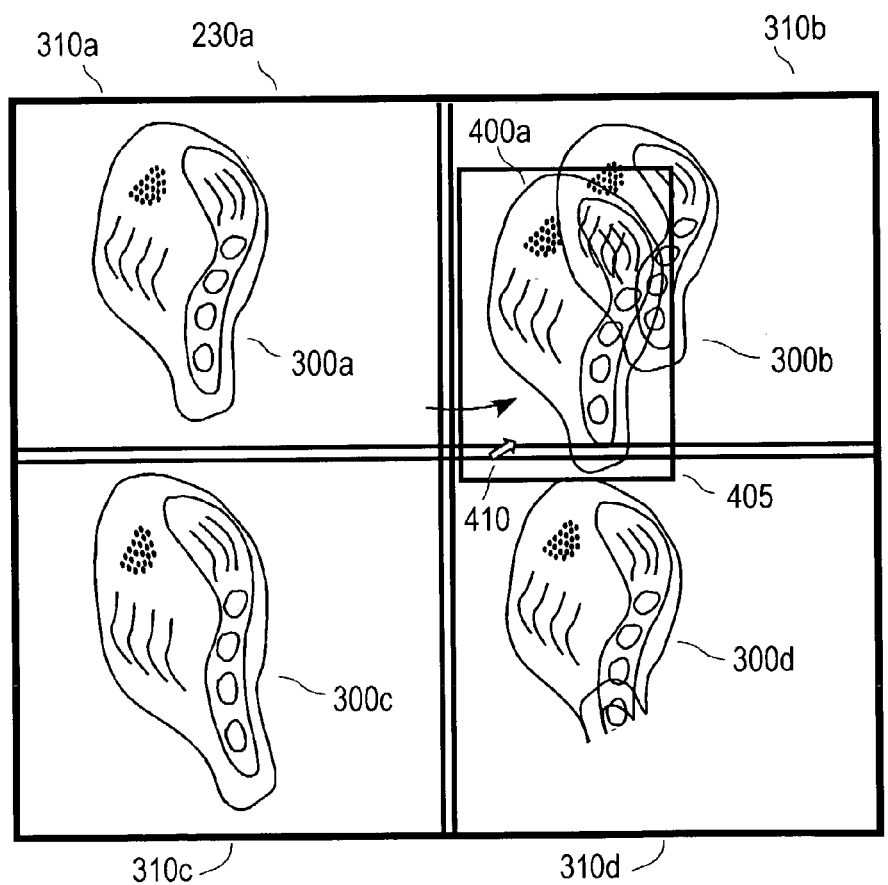
Figure 4D:
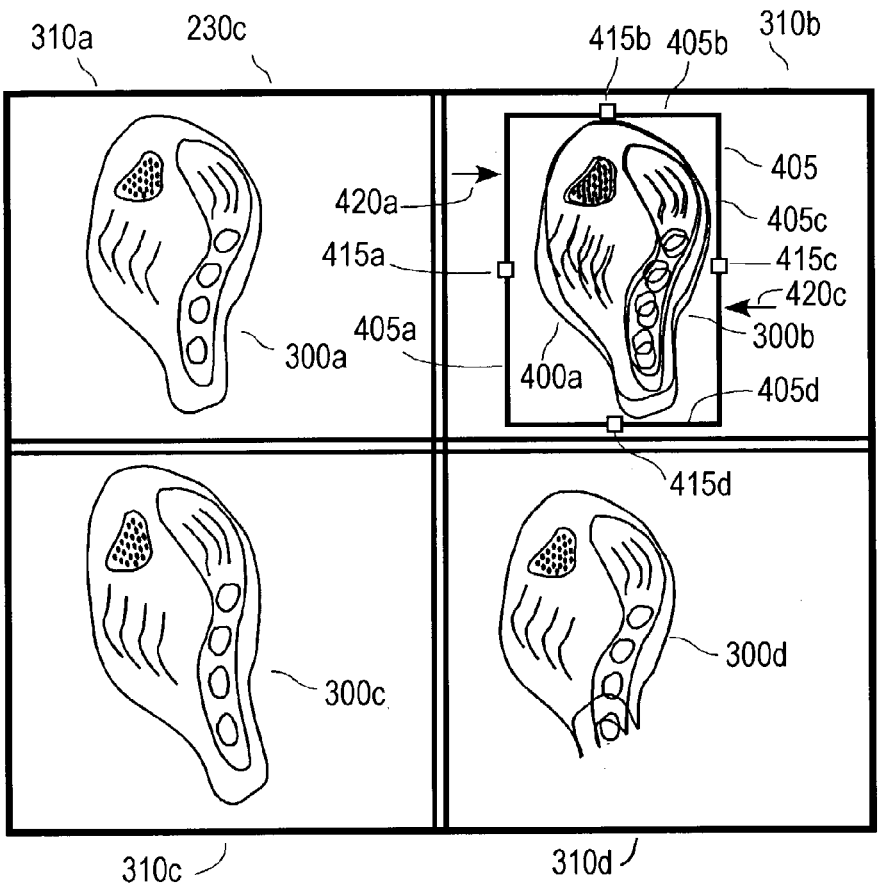

To drag and transform a serial section image, a reference-link region 405 is positioned over a serial section image, such as serial section image 300a, or portion thereof (see FIG. 4A). Positioning reference-link region 405 over a serial section image or a portion thereof, causes a copy of the image or portion to be created. The copy is referred to herein as a "ghost image." FIGS. 4B–4D show a time ordered sequence of events of dragging a ghost image 400a (a copy of image 300a) "over" image 300b. Ghost image 400a is dragged from screen window 310a (see FIG. 4B) to screen window 310b (see FIG. 4C). The ghost image is then placed "over" image 300b and approximately registered with image 300b (see FIG. 4D).

An image underlying a ghost image is referred to as an "underlying image." According to a particular implementation, a reference-link region is selected for dragging by (i) placing a pointer 410 within the reference-link region, (ii) pressing a control key 230d on input device 230b (e.g., a keyboard), and (iii) pressing a left-positioned button 230e on input device 230c (e.g., a mouse), see FIGS. 4A–4C. The reference-link region and ghost image may subsequently be dragged over an underlying image by appropriately manipulating input device 230c (e.g., dragging a mouse).

According to one embodiment, reference-link region 405 is created by a user selecting a create reference-link region option and placing the reference-link region in a desired location over an image. Creation of a reference-link region is selected, for example, from a menu, such as a drop down menu, context menu, or floating menu, or is selected by "pushing" a GUI button or by other known selection methods. The reference-link region is sized and placed over an image or portion of an image by a user using an input device, such as a mouse, to drag and locate the reference-link region as desired.

According to one embodiment, ghost images are transparent images through which an underlying image is visible. Note that structures of serial section 100b shown in image 300b (see FIGS. 4C–D) are visible through ghost image 400a. Transparency of the ghost image aids in registering the ghost image to the underlying image as the ghost image is dragged over the underlying image.

As a ghost image, such as ghost image 400a, is dragged over an underlying image, such as image 300b, pixel-image data of the images are linked by a set of links (sometimes referred to herein as "data links"). Links are formed for pixel-image data of a ghost image and an underlying image that are assigned the same coordinates on coordinate system 320. Pixel-image data assigned the same coordinates are those data that "overlay" and respectively "underlay" each other subsequent to a ghost image being positioned over an underlying image. Each link in a set of links forms an association between a given pair of overlying and underlying pixel image datum. Links may be data pointers, object links, linked lists or other database links. The links may be stored in a database, such as an object database. Links may be established for all pixel-image data or a subset thereof.

According to one embodiment, links are locked to prevent the links from being changed as the images are graphically manipulated (e.g., panning, zooming, or rotating). Images are locked, for example, by user using an input device to press a GUI button, select a menu option in a drop down menu, context menu, or floating menu or by other known selection means. According to a particular implementation, ghost images and underlying images are locked by double clicking a left positioned button 230e on input device 230c. Locked images can be unlocked, for example, to refine the registration between a ghost image and underlying image, by steps similar to those described above for image locking.

According to one embodiment, the shape of a ghost image is sheared and skewed to correct for physical deformations of the serial sections captured in ghost images and/or underlying images. According to a specific embodiment, shearing and skewing include stretching and/or compressing a ghost image in orthographic directions. Whereas in a broader sense shearing and skewing include morphing in arbitrary directions. A ghost image may be sheared and/or skewed to transform the shape of an imaged serial section, if not to its original pre-sliced and pre-mounted shape, at least to a shape similar to an underlying image. As ghost images are transparent, a user can readily determine regions where the ghost image and underlying image are not registered and then transform the ghost image into a "transformed ghost image" to refine the registration of corresponding structures of the ghost image and underlying image. In shearing and skewing a ghost image, pixel-image data of a transformed ghost image are assigned new (or "transformed") coordinates corresponding to the transformed positions of the ghost image's pixels. Additionally a new (or "transformed") set of links is generated that respectively link overlying and underlying pixel-image data of the transformed ghost image and underlying image.

According to one embodiment, a ghost image is sheared and/or skewed by manipulating handles positioned on a reference-link region. FIG. 4D shows a set of handles 415a–415d positioned respectively on sides 405a–405d of reference-link region 405. Handles 415a–415d can be manipulated by a user to orthographically stretch and/or compress ghost image 400a along the x- and y-axes, which are arbitrarily shown as extending vertically and horizontally, respectively. For convenience, reference to axes or planes, such as the x-axis, y-axis, or x-y-plane, includes all axes parallel to these axes and all planes parallel to these planes.

Figure 4E:
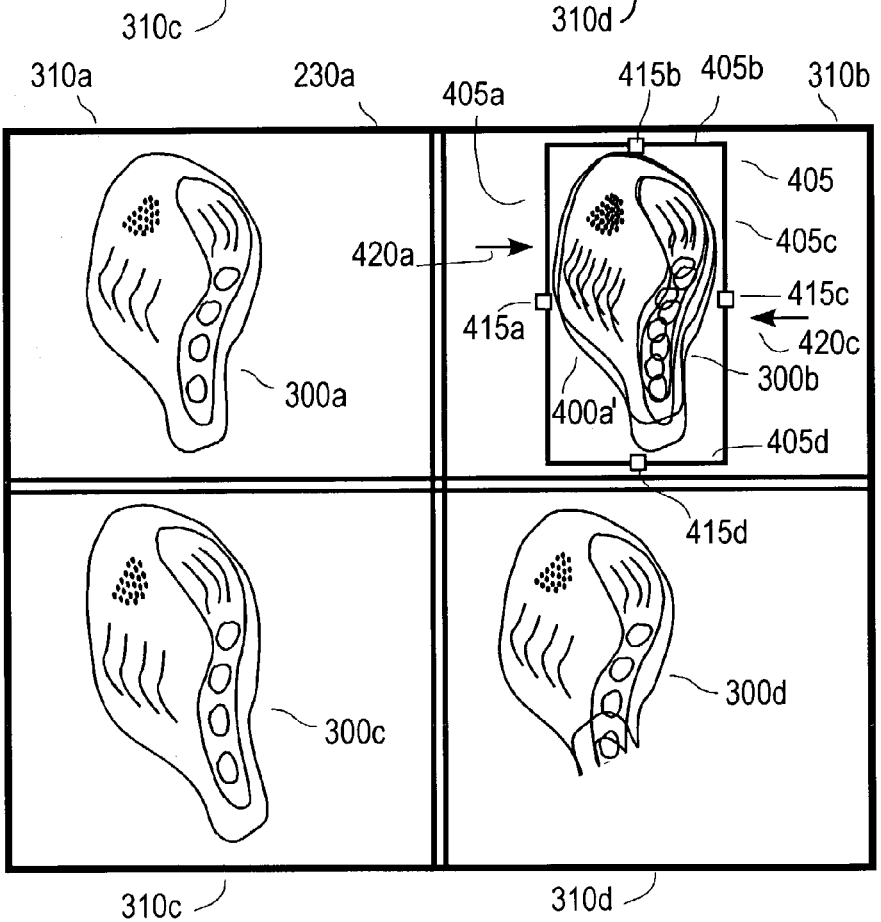
FIGS. 4E–G show a time ordered sequence of events of the compression of ghost image to refine the registration between the ghost image and an underlying image.
Figure 4F:
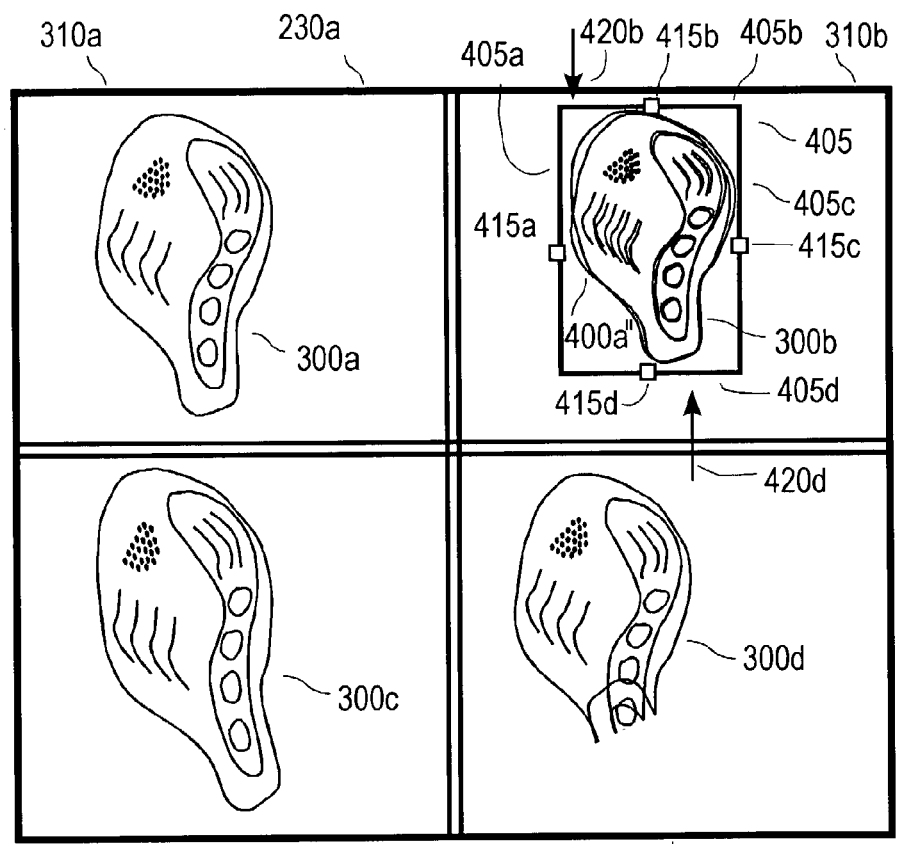
Figure 4G:
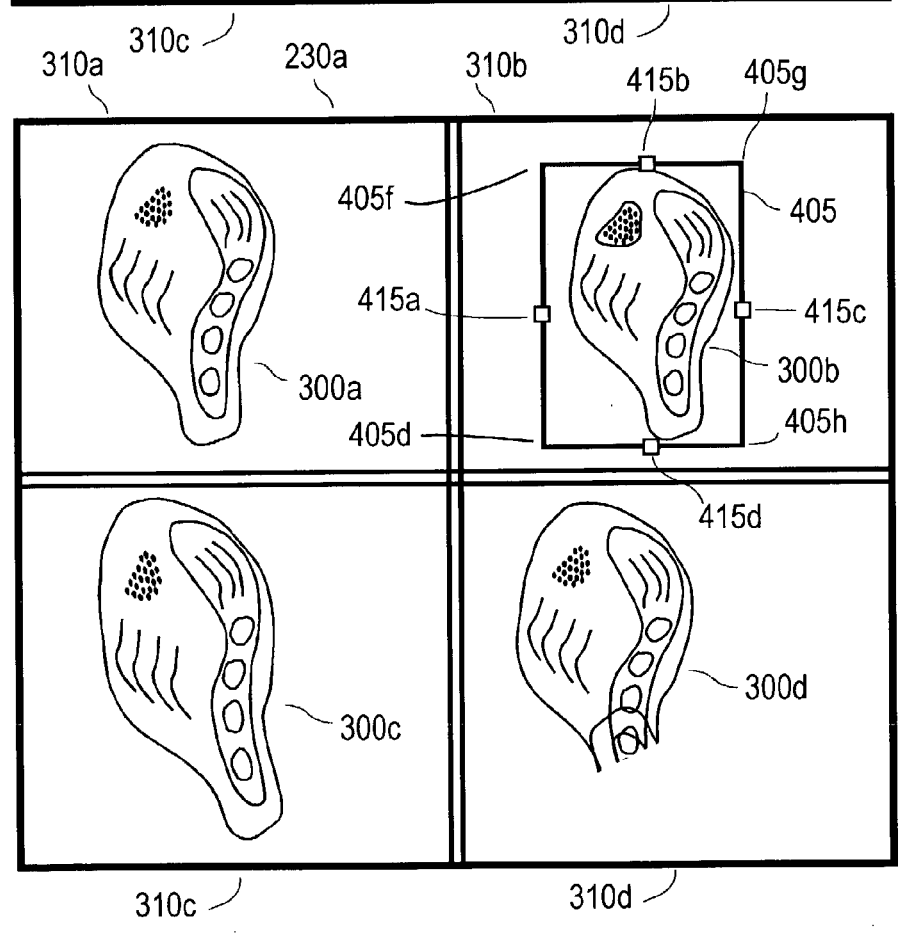

FIGS. 4D–4E show a time ordered sequence of events of first compressing ghost image 400a along the y-axis to form a transformed ghost image 400a', and FIGS. 4F–4G show a time ordered sequence of event of compressing the ghost image along the x-axis to form a transformed ghost image 400a". In compressing ghost image 400a along the y- and x-axes, the registration of ghost image 400a and underlying image 300b is refined to simplify cross comparisons of the serial section images. To compress ghost image 400a along the y-axis and form transformed ghost image 400a', handles 415a and/or 415c are moved inward as indicated by arrows 420a and 420c. This manipulation refines the registration of the ghost image and underlying image along to the y-axis. To compress transformed ghost image 400a' along the x-axis and form transformed ghost image 400a", handles 415b and/or 415d may be moved inward as indicated by arrows 420b and 420d. This manipulation of handles 415b and/or 415d refines the registration of transformed ghost image 400a" and underlying image 300b along the x-axis.

Figure 4H:
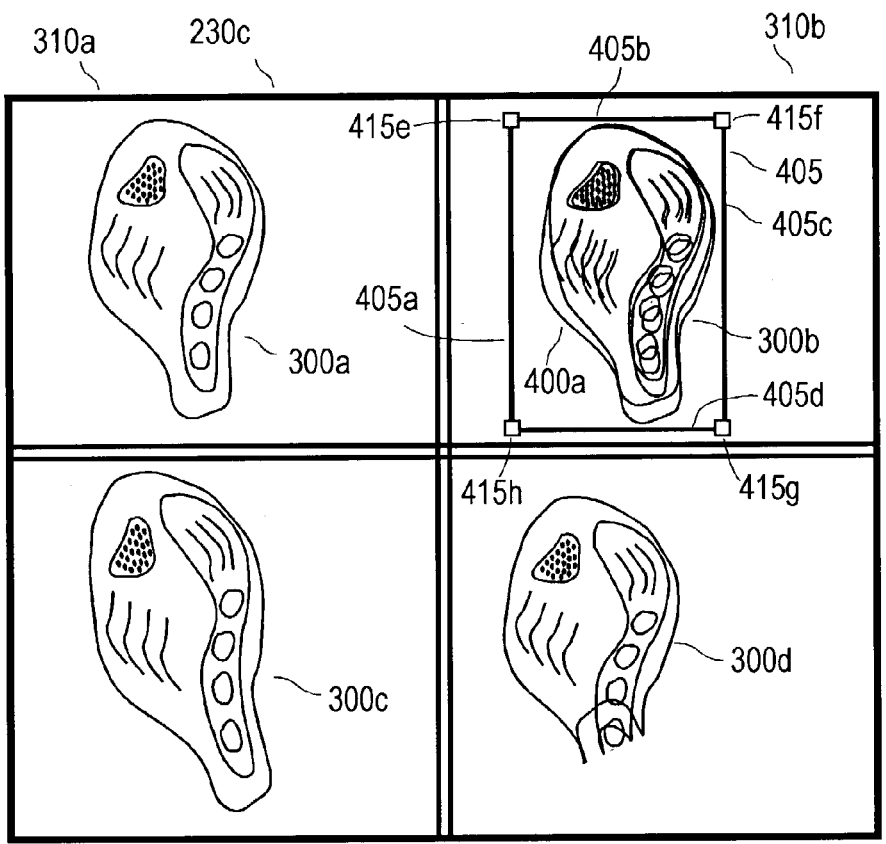
FIG. 4H shows a reference-link region having handles positioned on corners of the region.

According to one embodiment of the present invention, reference-link region 405 and ghost image 400a may be simultaneously stretched and/or compressed along both the y- and x-axes by manipulating one of handles 415e–415h positioned on the corners of reference-link region 405, see FIG. 4H.

Figure 4I:
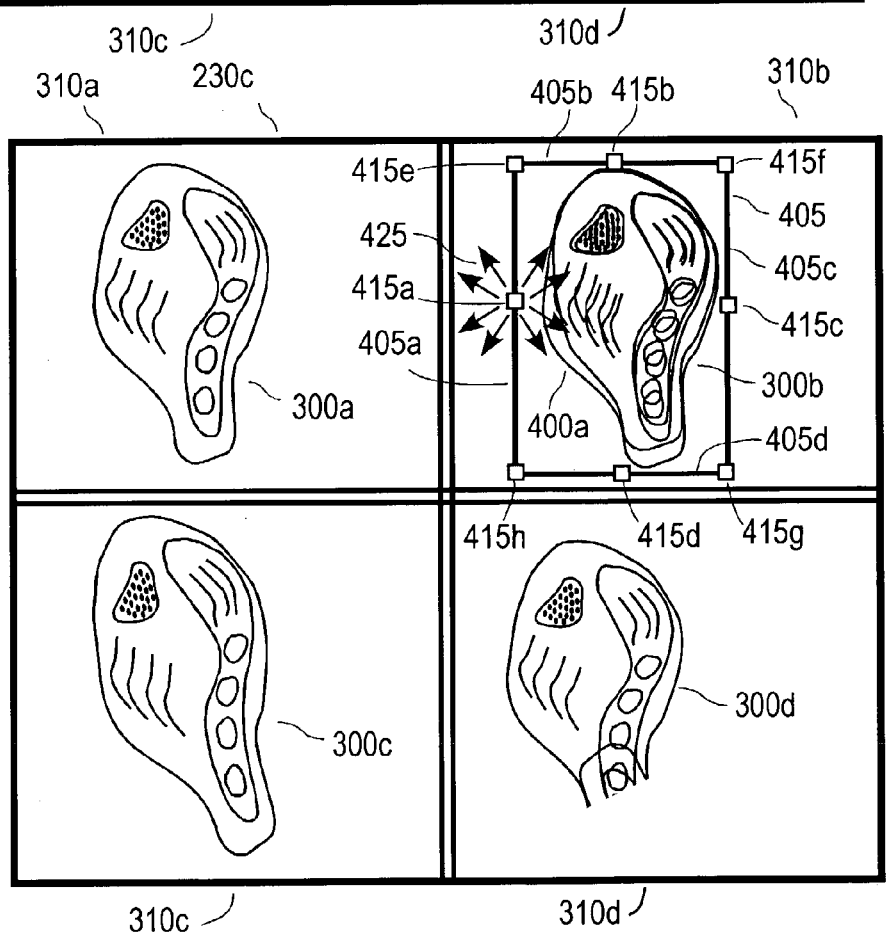
FIG. 4I shows a reference-link region having handles positioned on the corners and sides of the region.
Figure 4J:
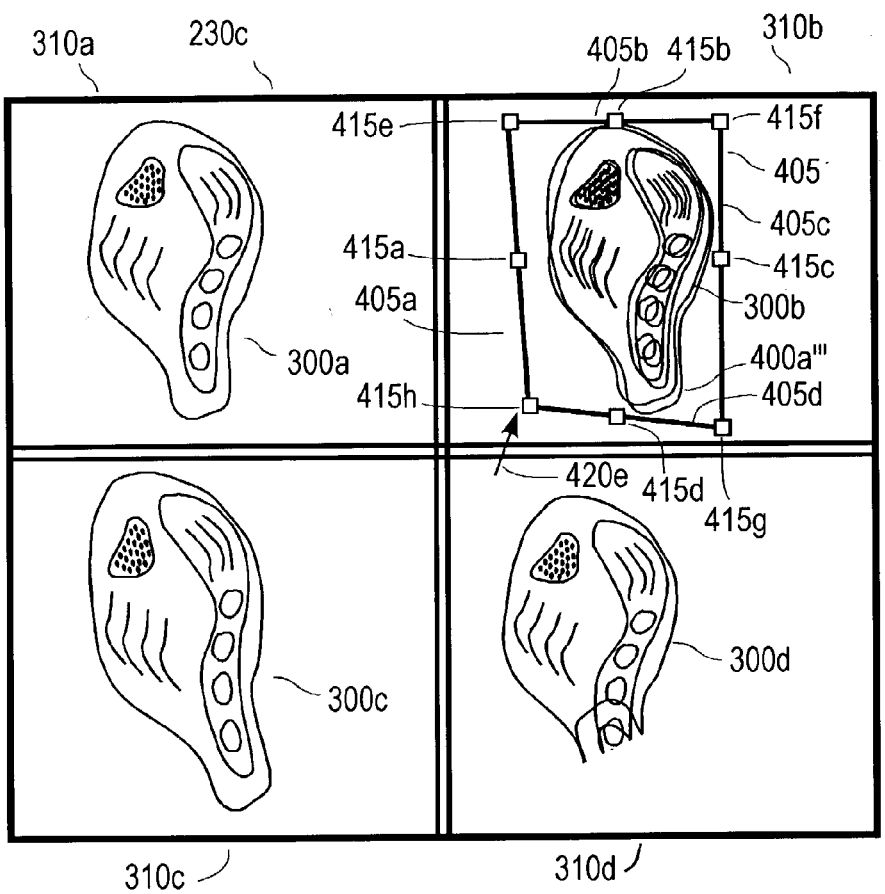
FIGS. 4J–4K show a time ordered sequence of events of shearing and skewing a ghost image.
Figure 4K:
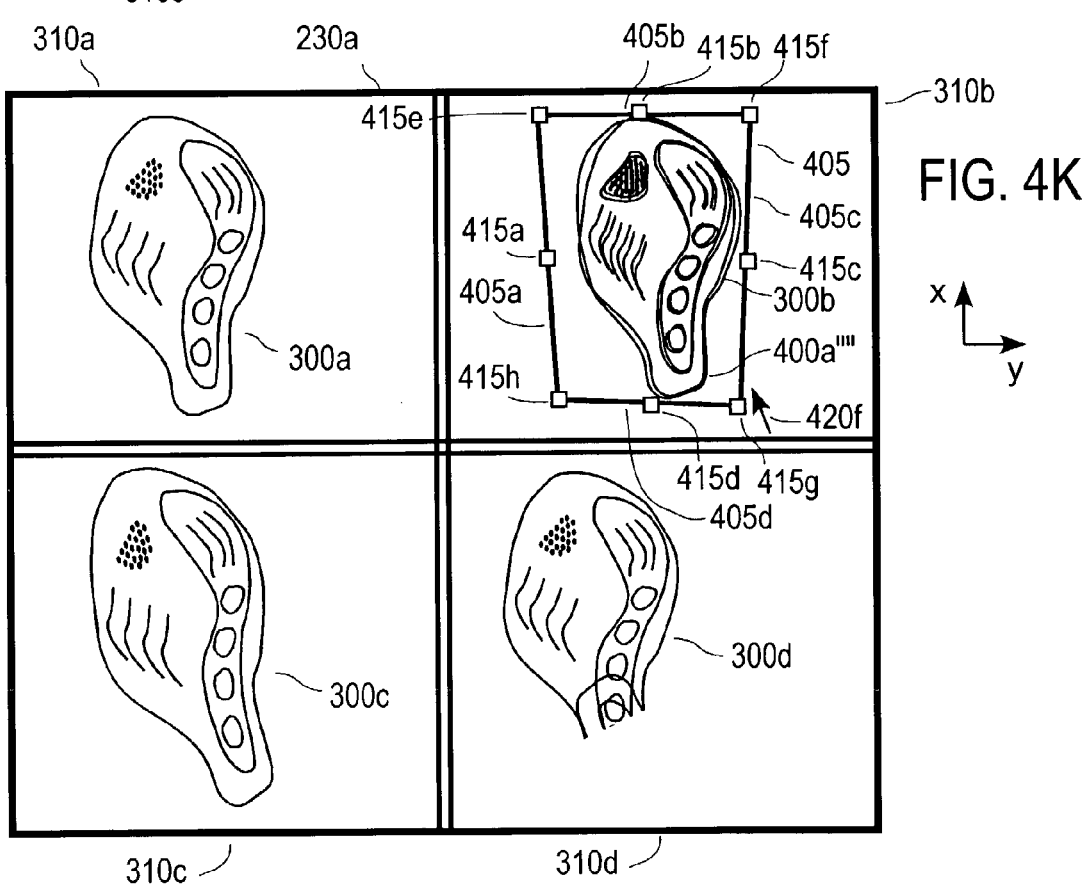

According to another embodiment, handles 415a–415h are used more generally to shear and skew reference-link region 405 and ghost image 400a. To more generally shear and skew ghost image 400a, handles 415a–415h are not constrained to move orthographically as discussed in the preceding example, but can be moved arbitrarily in nearly any direction in the x-y plane. FIG. 4I shows a set of arrows 425 indicating a few of the arbitrary directions in which handle 415a can be moved. Each of handles 415b–415h can be similarly moved in the directions indicated by arrows 425, as well as numerous other directions. FIGS. 4J–4K show a time ordered sequence of events of handles 415h and 415g being moved in directions indicated by arrows 420e and 420f, respectively, to form transformed images 400a''' and 400a'''' and to refine the registration of these transformed ghost images with underlying image 300a.

In the foregoing embodiments reference-link regions have been shown to be four sided regions (often rectangular) having four or eight handles located on the sides and/or corners of the reference-link regions. Embodiments of the present invention are not limited to having four sides with handles located on the sides and corners of a reference-link region. Reference-link regions, according to embodiments of the present invention, may have nearly any arbitrary shape with handles arbitrarily located on the reference-link regions to affect a wide variety of topological morphs. The handles can be constrained to move in set directions or can be unconstrained to move in arbitrary directions. While some of the above examples have discussed sets of handles constrained to move orthographically, handles can be constrained to move in set directions or at nearly any other angle between 0° and 360°. For example, a pentagonal reference-link region may have handles constrained to move at 72° with respect to nearest neighbor handles.

According to one embodiment, handles, such as handles 415a–415h, are moved by a user using input device 230c to select and drag the handles. According to an alternate embodiment, handles are moved by a user using input device 230b to enter handle coordinates. Those of skill in the art will no doubt know of other useful tools and methods to move handles positioned on a reference-link region.

Figure 5A:
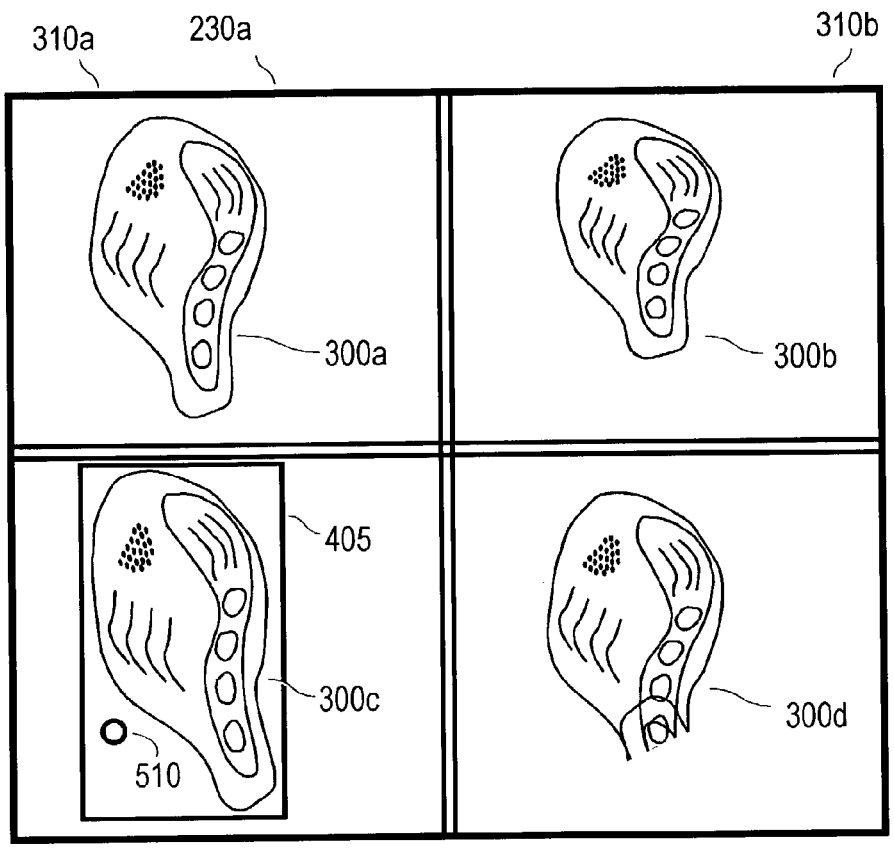
FIGS. 5A–5D show a time ordered sequence of events of the rotation and compression of a ghost image to register the ghost image to the underlying image.
Figure 5B:
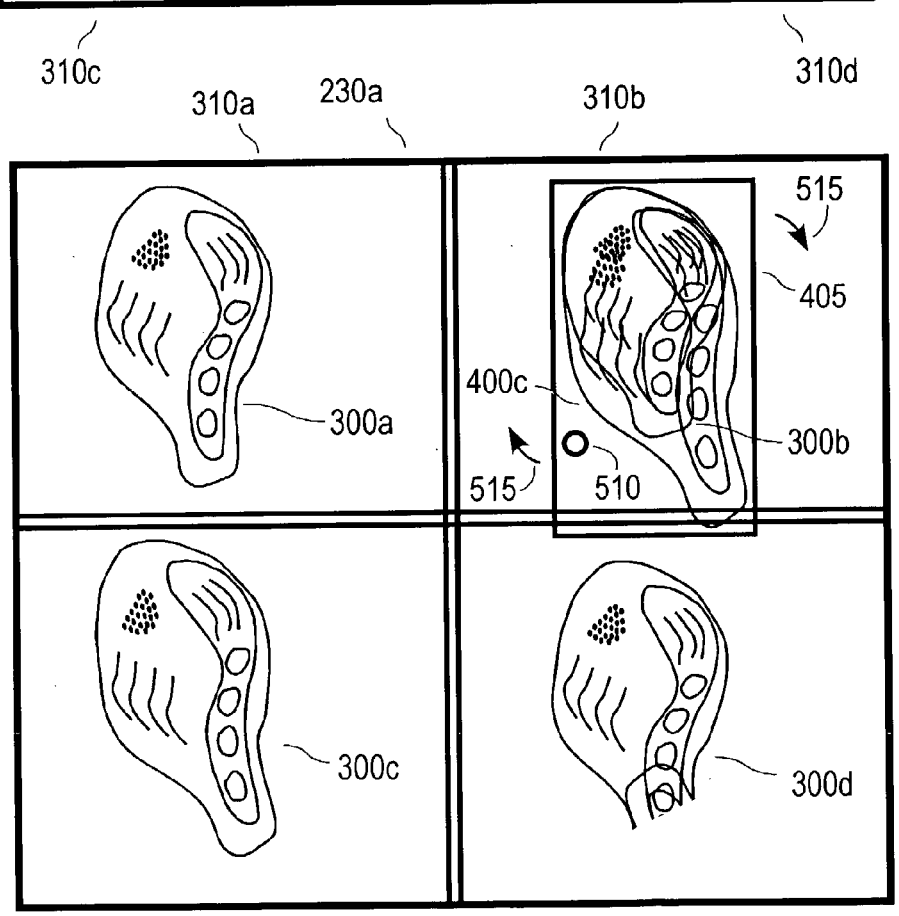
Figure 5C:
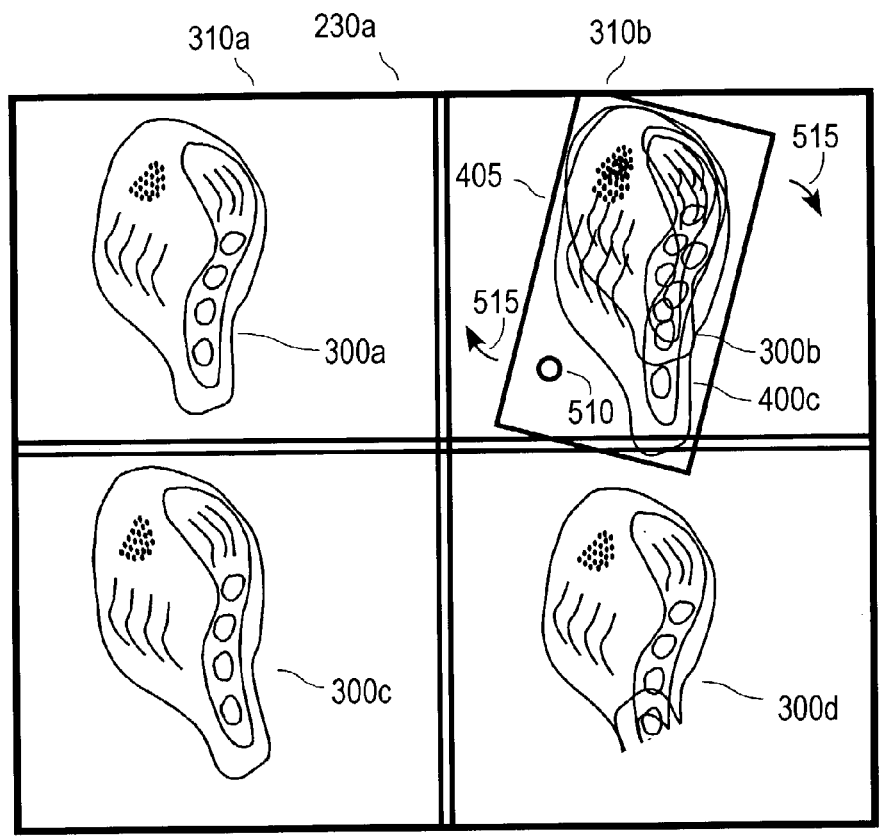
Figure 5D:
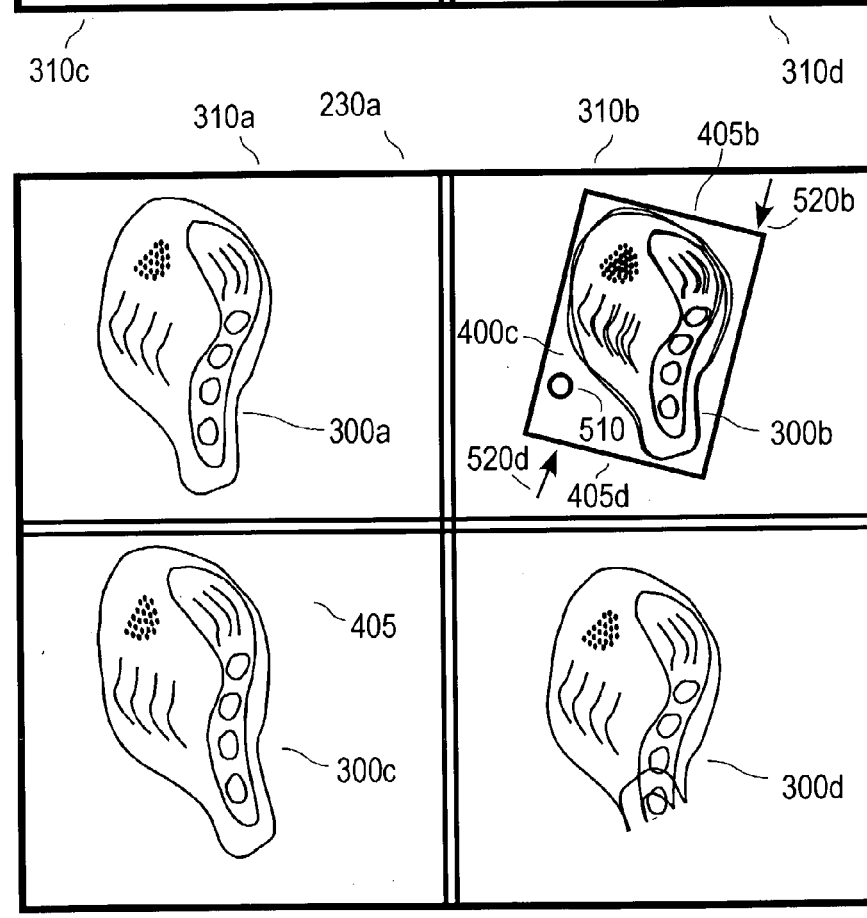

According to another embodiment of the present invention, reference-link regions are rotated to register ghost images to underlying images. FIGS. 5A–5C show a time ordered sequence of events of rotating ghost image 400c, corresponding to digital image 300c, to register the ghost image to underlying image 300b. According to a specific implementation, a GUI button 510 is pressed and held using input device 230c (e.g., a mouse), as the input device is used to drag the GUI button causing the reference-link region to rotate (indicated by arrows 515). According to another embodiment, input device 230b (e.g., a keyboard) is used to enter commands to rotate the reference-link region. Subsequent to rotation, ghost image 400c is shown to be compressed, as indicated by arrows 520b and 520d, to further refine the registration of the ghost image and underlying image.

According to another embodiment of the present invention, reference-link regions may be sheared and skewed according to weighted shear and skew distributions, respectively. That is, given portions of a ghost image are sheared or skewed by a greater amount than other portions of the ghost image. For example, portions of a ghost image nearest a handle are sheared or skewed by a greater amount than portions of the ghost image farther from the handle. For purposes of convenience, the following discussion describes a technique for a special case of a weighted shearing and skewing distribution, namely a weighted stretching and compressing distribution. The following technique is applicable, however, to shearing and skewing in a more general sense.

Figure 6:
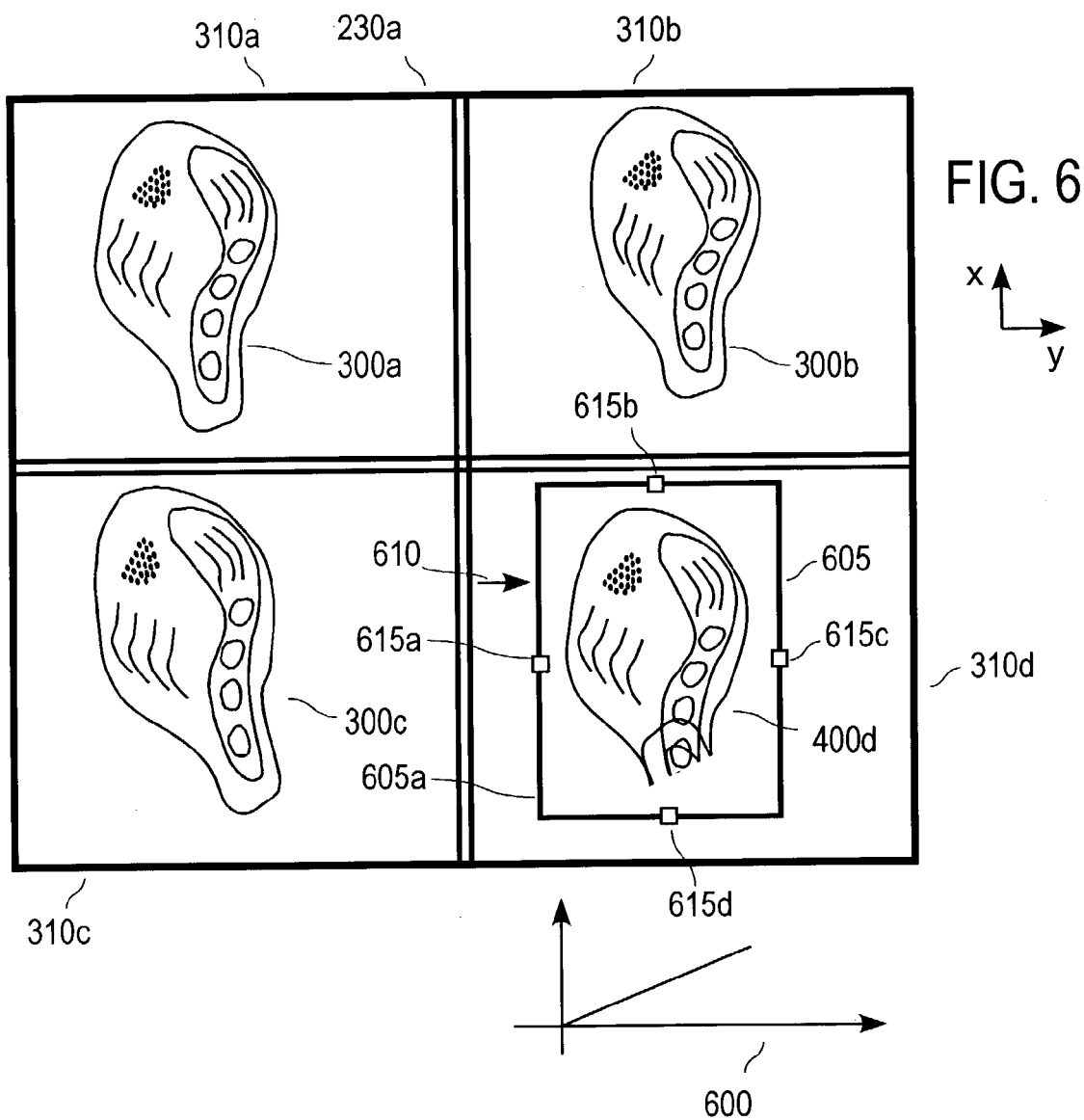
FIG. 6 shows a graph approximately aligned with a reference-link region surrounding a ghost image to indicate weighted compression and stretching of the reference-link region.

FIG. 6 shows a graph 600 approximately aligned with reference-link region 605 surrounding ghost image 400d. Graph 600 is used as a visual aid to indicate portions of ghost image 400d stretched or compressed by a greater or lesser amount than other portions. The increasing value of graph 600 from left to right, indicates the increase stretch or compression of the ghost image from side 605a to side 605c, for example, as handle 615a is moved in the direction of arrow 610. Weighted compression and stretch of serial section images need not linearly change, as indicated by the approximately linearly changing value of graph 600, but can have a variety of weighted stretch and compression profiles, such as parabolic, cubic or other profile. Weighted compression and stretch can thus be adjusted to match the approximate physical properties affecting actual compression and stretch, such as tissue sample density, water content, temperature, and the like.

Figure 7:
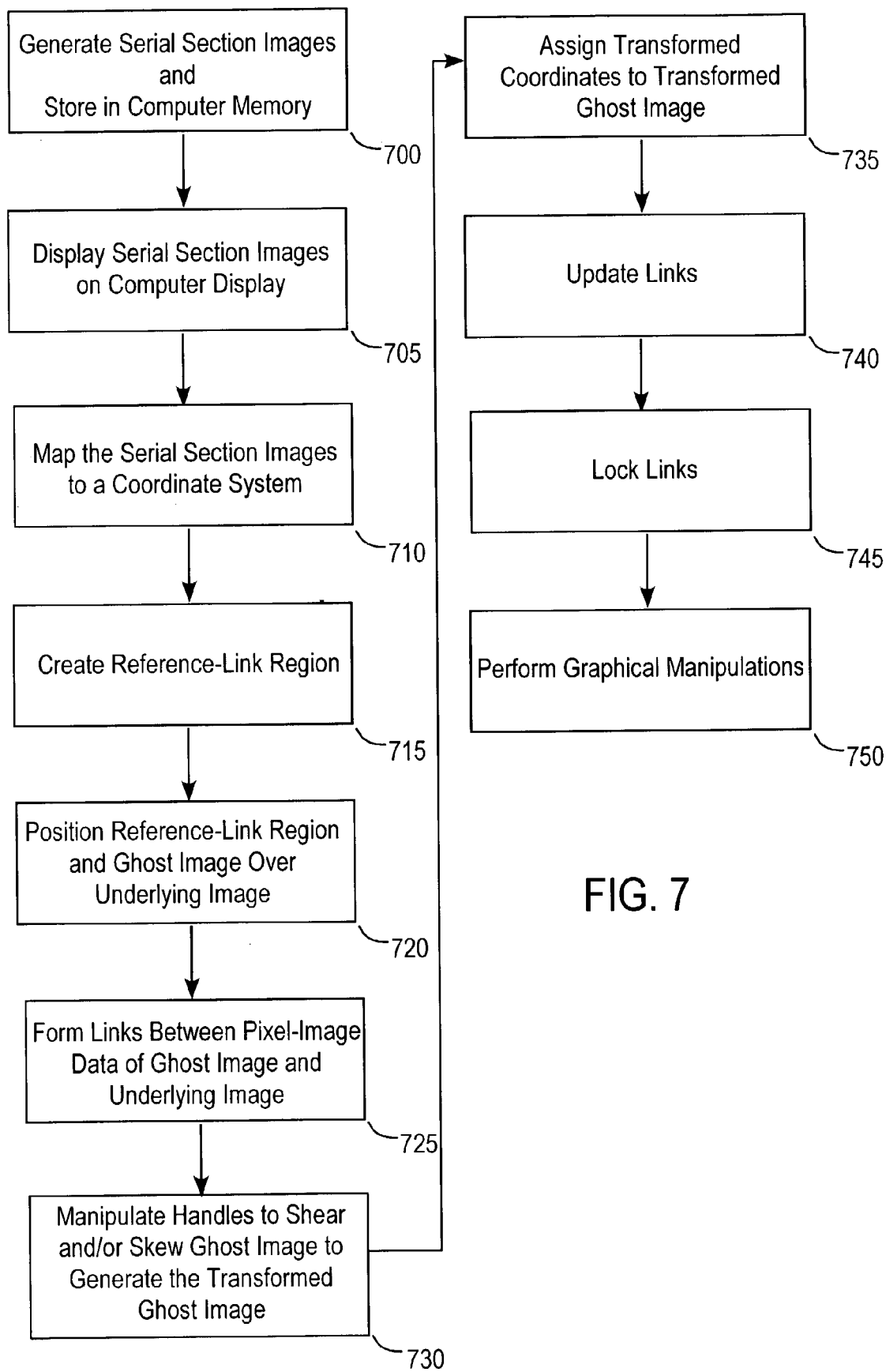
FIG. 7 is a flow chart showing steps for registering disparately shaped serial section images.

FIG. 7 is a flow chart showing steps for registering, linking, and locking a set of serial section images. According to an initial step 700, a set of serial section images is generated and stored in a computer. The serial section images may be generated, for example, by capturing images of serial sections with a digital camera (e.g., CDD or CMOS camera) mounted on a microscope. The serial section images may also be generated by scanning the serial sections using a flat bed scanner. In a subsequent step 705, the serial section images are read from a computer memory and displayed in a window or in a set of windows on a computer display, which is controlled by the computer. The displayed serial section images are mapped to a coordinate system to track the positions, orientations, and shapes of the serial section images, step 710. In the mapping step, pixel-image data of the serial section images are assigned coordinates relative to their position on the coordinate system. Subsequent to displaying the serial section images, a reference-link region is created and positioned over at least one of the serial section images or a portion thereof, step 715. Positioning the reference-link region over a serial section image or portion thereof causes a ghost image to be generated. In a step 720, the reference-link region and ghost image are positioned to overlay an underlying image. The reference-link region and ghost image may be positioned over the underlying image, for example, by dragging the region and image using a computer input device, such as a mouse. Positioning the ghost image over the underlying image causes pixel-image data of the two images to be linked, step 725. Links may be in the form of data pointer, object links, or other database links, which are stored in a database, such as an object database. According to one embodiment, handles are positioned on the reference-link region and are manipulated by a user to shear and/or skew the ghost-image to form a transformed ghost image, step 730. Shearing and skewing serve to refine the registration of the ghost image and underlying image. As the ghost image is transformed to form the transformed ghost image, new (or "transformed") coordinates are assigned to the pixel-image data of the transformed ghost image, step 735. The reference-link region and ghost image may optionally be rotated to adjust for relative rotations between the ghost-image and underlying image. Similar to shearing and skewing, as the ghost image is rotated, new coordinates are assigned to the pixel-image data of the rotated ghost image. In addition to assigning new coordinates to a transformed and/or rotated ghost image, the links between the pixel-image data of the transformed and/or rotated ghost image and underlying image are updated, step 740. Subsequent to updating the links, the links are locked, step 745. Locking the links prevents the links from being inadvertently changed as the transformed ghost image and underlying image are graphically manipulated. Either the transformed ghost image or underlying image can be graphically manipulated, such as by magnifying, panning, or rotating the images. Graphical manipulation of either the transformed ghost image or the underlying image causes the other image to be similarly graphically manipulated, step 750.

Figure 8:
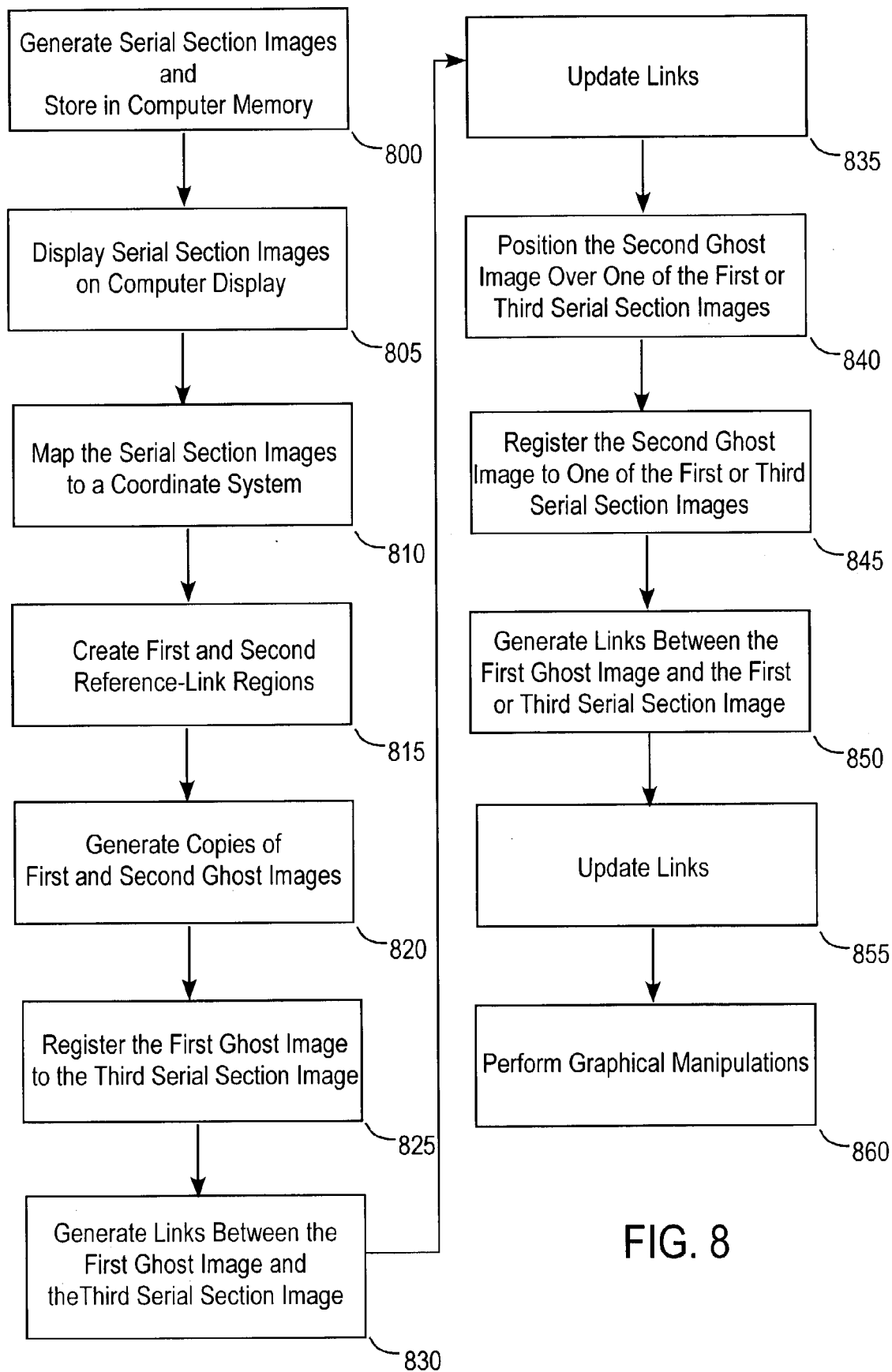
FIG. 8 is a flow chart showing steps for registering disparately shaped serial section images.

FIG. 8 is a flow chart showing steps for registering, linking, and locking a set of three serial section images. For convenience, the three serial section images are referred to as first, second, and third serial section images. According to an initial step 800, the serial section images are generated and stored in a computer. In a subsequent step 805, the serial section images are read from a computer memory and displayed in a window or in a set of windows on a computer display, which is controlled by the computer. Either prior or subsequent to displaying the serial section images, pixel-image data of the images are mapped to a coordinate system, step 810. Subsequently, first and second reference-link regions are created and positioned respectively over the first and second serial section images, step 815. Copies of the first and second serial section images are generated, which are referred to as the first and second ghost images, respectively, step 820. The first ghost image is positioned over the third serial section image, and handles on the first reference-link region are manipulated to shear, skew, and/or rotate the first ghost image to approximately register the first ghost image with the third serial section image, step 825. A first set of links is established between the first ghost image and the third serial section image, step 830. The links are updated as the first ghost image is sheared, skewed, and/or rotated, step 835. The second ghost image is optionally positioned over the first serial section image or the third serial section image, step 840. Depending on which of the first and third serial section images underlies the second ghost image, the second ghost image is sheared, skewed and/or rotated to approximately register the second ghost image to the first or third serial section image, step 845. Again, depending on which of the first and third serial section images underlies the second ghost image, a set of links is established between the second ghost image and the first or third serial section image, step 850. The links are locked subsequent to approximate registration of the images, step 855. The links between the first serial section image and the third serial section image and the links between the second serial section image and the first or third serial section images cause two of the serial section images to be graphically manipulated similarly to graphical manipulation of the other serial section image, step 860. For example, if a user magnifies, pans, or rotates one of the three serial section images, the other two serial section images will similarly be magnified, panned, or rotated. While the forgoing describes a set of steps for registering, linking, and locking three serial section images, the above steps may be repeated to register, link, and lock nearly any number of serial section images.

Figure 9:
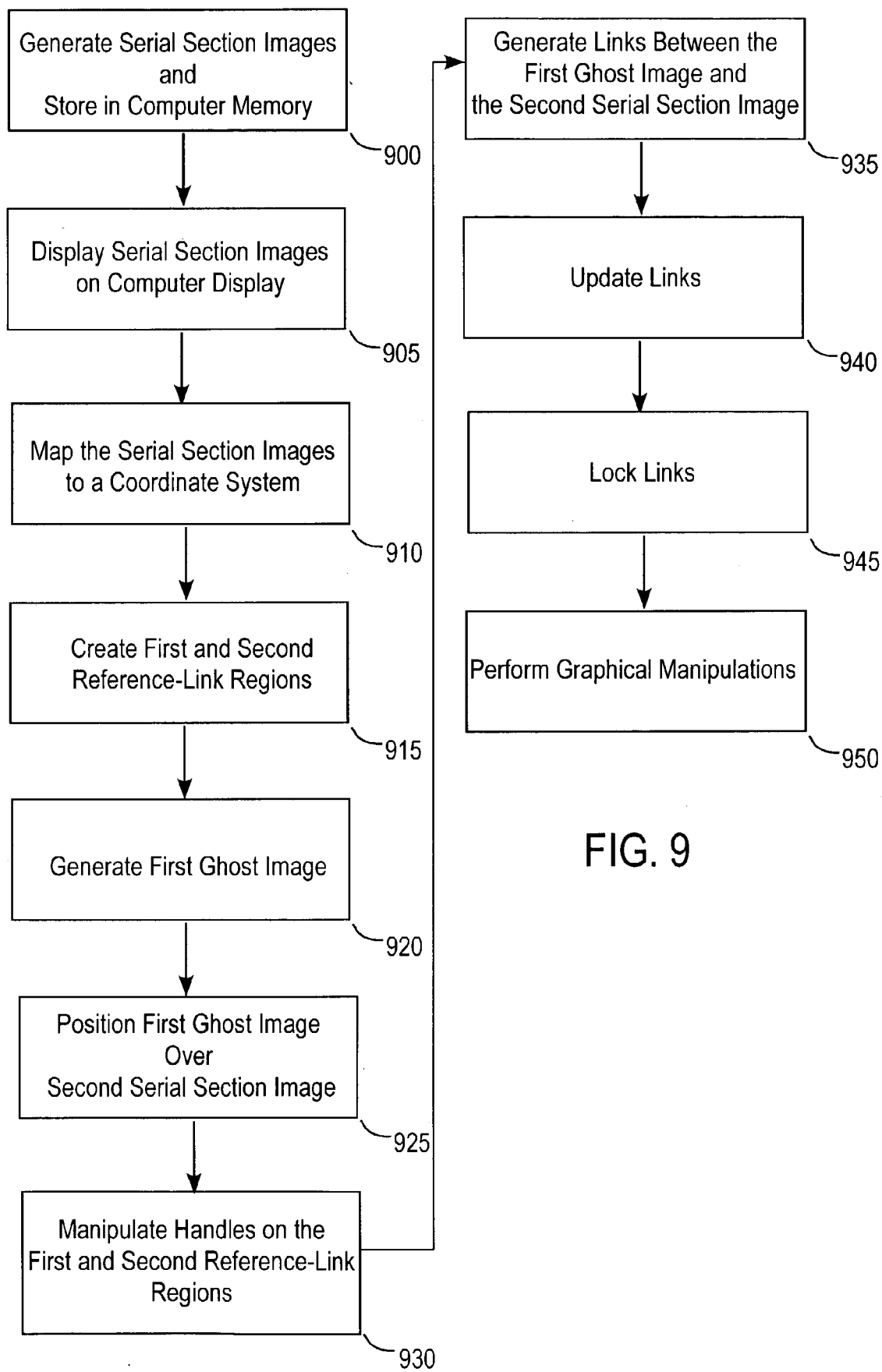
FIG. 9 is a flow chart showing steps for registering disparately shaped serial section images.

FIG. 9 is a flow chart showing steps for registering, linking, and locking first and second serial sections images. According to an initial step 900, the serial section images are generated and stored in a computer. In a subsequent step 905, the serial section images are read from a computer memory and displayed in a window or in a set of windows on a computer display, which is controlled by the computer. Either prior or subsequent to displaying the serial section images, pixel-image data of the images are mapped to a coordinate system, step 910. Subsequently, first and second reference-link regions are generated and positioned over the first and second serial section images, respectively, step 915. A copy of the first serial section image is generated, which is referred to as the first ghost image, step 920. A second ghost image of the second serial section may optionally be generated. The first ghost image is positioned over the second serial section image, step 925. Handles on the first and/or second reference-link regions are manipulated to shear, skew, and/or rotate the first ghost image and the second serial section image, respectively, to approximately register the two images, step 930. A set of links is established between the pixel-image data of the two images for pixel-image data assigned the same coordinates, step 935. The coordinates and links are updated as the images are sheared, skewed, and/or rotated, step 940. The links are locked subsequent to approximate registration of the two images, step 945. Subsequently, either the first or second serial section image is graphically manipulated causing the other serial section image to be similarly graphically manipulated, step 950.

CONCLUSION

It is understood that the examples and embodiments described above are for illustrative purposes only and that various modifications or changes in light thereof will be suggested to persons skilled in the art and are to be included within the spirit and purview of this application and scope of the appended claims. For example, while linking and locking and serial section images have been characterized as different steps, these steps may be combined. For example, images may be linked by pushing and holding a button on a mouse as the ghost image is dragged over an underlying image, and the links may be locked by releasing the mouse button. Therefore, the above description should not be taken as limiting the scope of the invention as defined by the claims.

What is claimed is:

1. A computerized method for linking digitized images of serial sections of a biological tissue sample such that the digitized images of the serial sections are displayed on a computer display that is controlled by a computer, the method comprising:

creating a copy of a digitized image of a first serial section, the copy being referred to as the ghost image simultaneously display the digitized image of the first serial section and the ghost image;

positioning the ghost image over a digitized image of a second serial section, the digitized image of the second serial section being visible through the ghost image and being referred to as the underlying image;

registering the ghost image to the underlying image; and linking the ghost image and the underlying image such that when manipulations are performed on either the ghost image or the underlying image, the other of the images is similarly manipulated.

2. The method of claim 1 further comprising rotating the ghost image to refine the registration of the ghost image to the underlying image.

3. The method of claim 1 wherein the copying step includes positioning a reference-link region on the digitized image of the first serial section image to create the ghost image.

4. The method of claim 3 wherein the reference-link region is rectangular.

5. The method of claim 1 wherein the copy of the digitized image of the first serial section is a copy of a portion of the first image of the first serial section.

6. The method of claim 1 wherein the registering step includes shearing or skewing the ghost image.

7. The method of claim 1 wherein the registering step includes manipulating at least one handle of a set of handles on the reference-link region to shear or skew the ghost image.

8. The method of claim 1 wherein the registering step includes stretching or compressing the ghost image along an axis.

9. The method of claim 8 wherein the registering step further includes stretching or compressing the ghost image along a second axis.

10. The method of claim 9 wherein the first mentioned axis and second axis are orthogonal.

11. The method of claim 9 wherein the first mentioned axis and second axis are non-orthogonal.

12. The method of claim 1 further comprising mapping the ghost image and the second image to a coordinate system.

13. The method of claim 12 wherein links are generated between pixel-image data of the ghost image and pixel-image data of the underlying image that have the same coordinates.

14. The method of claim 1 wherein linking the ghost image and the underlying image includes generating data links between image data of the ghost image and the underlying image.

15. The method of claim 14 wherein the data links are data pointers between pixel-image data of the ghost image and pixel image data of the underlying image.

16. The method of claim 15 and further including storing the data links in an object database.

17. The method of claim 14 and further including locking the data links between the ghost image and underlying image such that the data links do not change during manipulation of the ghost image and underlying image.

18. The method of claim 1 wherein the manipulations of the ghost image and the underlying image include at least one member of a group that includes magnifying, panning, and rotating.

19. A computerized method for linking digitized images of serial sections of a biological tissue sample such that the digitized images of the serial sections are displayed on a computer display that is controlled by a computer, the method comprising:
displaying simultaneously the digitized image of a serial section, from which a ghost image is created, and the ghost image; positioning the ghost image over an underlying image, wherein the ghost image and the underlying images are digitized images of different serial sections of the biological tissue sample;
registering the ghost image to the underlying image; and
linking the ghost image and the underlying image such that when manipulations are performed on either the ghost image or the underlying image, the other of the images is similarly manipulated.

20. A computer program product stored on a computer-readable storage medium for linking digitized images of serial sections of a biological tissue sample, the computer program product comprising:
code for creating a copy of a digitized image of a first serial section, the copy being referred to as the ghost image code for simultaneously display the digitized image of the first serial section and the ghost image;
code for positioning the ghost image over a digitized image of a second serial section, the digitized image of the second serial section being visible through the ghost image and being referred to as the underlying image;
code for registering the ghost image to the underlying image; and
code for linking the ghost image and the underlying image such that when manipulations are performed on either the ghost image or the underlying image, the other of the images is similarly manipulated.

21. The method of claim 20 and further comprising code for rotating the ghost image to refine the registration of the ghost image to the underlying image.

22. The method of claim 20 wherein the code for copying includes code for positioning a reference-link region on the digitized image of the first serial section image to create the ghost image.

23. The method of claim 22 wherein the reference-link region is rectangular.

24. The method of claim 20 wherein the copy of the digitized image of the first serial section is a copy of a portion of the first image of the first serial section.

25. The method of claim 20 wherein the code for registering includes code for shearing or skewing the ghost image.

26. The method of claim 20 wherein the code for registering includes code for manipulating at least one handle of a set of handles on the reference-link region to shear or skew the ghost image.

27. The method of claim 20 wherein the code for registering includes code for stretching or compressing the ghost image along an axis.

28. The method of claim 27 wherein the code for registering further includes code for stretching or compressing the ghost image along a second axis.

29. The method of claim 27 wherein the first mentioned axis and second axis are orthogonal.

30. The method of claim 27 wherein the first mentioned axis and second axes are non-orthogonal.

31. The method of claim 20 further comprising code for mapping the ghost image and the second image to a coordinate system.

32. The method of claim 31 wherein links are generated between pixel-image data of the ghost image and pixel-image data of the underlying image that have the same coordinates.

33. The method of claim 20 wherein code for linking the ghost image and the underlying image includes code for creating data links between image data of the ghost image and the underlying image.

34. The method of claim 33 wherein the data links are data pointers between pixel-image data of the ghost image and pixel image data of the underlying image.

35. The method of claim 34 and further including code for storing the data links in an object database.

36. The method of claim 33 and further including code for locking the data links between the ghost image and underlying image such that the data links do not change during manipulation of the ghost image and underlying image.

37. The method of claim 20 wherein the manipulations of the ghost image and the underlying image include at least one member of a group that includes magnifying, panning and rotating.

38. A serial section imaging system for digitizing magnified images of serial sections of a biological tissue sample and for adjusting deformations and relative rotations of the serial sections imaged in the digitized images, the system comprising:

a computer system including a display, a memory, and an input device, wherein the computer is configured to:
receive the digitized images from a charged coupled device (CCD) camera, store the digitized images in the memory, and display the digitized images on the display;
create a copy of one of the digitized images of a first serial section, the copy is referred to as the ghost image simultaneously display the digitized image of the first serial section and the ghost image;
position the ghost image over another of the digitized images of a second serial section, the digitized image of the second serial section being visible through the ghost image and is referred to as the underlying image;
register the ghost image to the underlying image; and
link the ghost image and the underlying image such that when manipulations are performed on either the ghost image or the underlying image, the other of the images is similarly manipulated.

39. The system of claim 38 and further comprising:

a microscope configured to magnify images of the first and second serial sections for ocular display and digital image capture; and a charge coupled device (CCD) camera coupled to the microscope, the CCD camera being configured to generate the digital images data for the digital images and communicate the digital image data to the computer system.

* * * * *